(12) United States Patent
Kim et al.

(10) Patent No.: US 12,153,383 B2
(45) Date of Patent: Nov. 26, 2024

(54) ELECTRONIC DEVICE INCLUDING DETACHABLE ORNAMENTAL MEMBER

(71) Applicant: Samsung Electronics Co., Ltd., Suwon-si (KR)

(72) Inventors: Hyeonjoong Kim, Suwon-si (KR); Donghun Song, Suwon-si (KR); Kwangsoo Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 858 days.

(21) Appl. No.: 17/196,308

(22) Filed: Mar. 9, 2021

(65) Prior Publication Data

US 2021/0382439 A1 Dec. 9, 2021

(30) Foreign Application Priority Data

Jun. 4, 2020 (KR) ........................ 10-2020-0067383

(51) Int. Cl.
*G06F 1/16* (2006.01)
*G04B 37/14* (2006.01)
*G04B 47/04* (2006.01)

(52) U.S. Cl.
CPC ....... *G04B 47/046* (2013.01); *G04B 37/1486* (2013.01); *G06F 1/163* (2013.01)

(58) Field of Classification Search
None
See application file for complete search history.

(56) References Cited

U.S. PATENT DOCUMENTS 5,490,123 A 2/1996 Biver
2016/0320756 A1 11/2016 Lee et al.
(Continued)

FOREIGN PATENT DOCUMENTS

JP 2009-186279 A 8/2009
KR 10-2016-0128120 A 11/2016
(Continued)

OTHER PUBLICATIONS

International Search Report dated Jun. 14, 2021, issued in International Patent Application No. PCT/KR2021/003015.
(Continued)

*Primary Examiner* — Anthony Q Edwards
*Assistant Examiner* — Rashen E Morrison
(74) *Attorney, Agent, or Firm* — Jefferson IP Law, LLP

(57) ABSTRACT

An electronic device is provided. The electronic device includes a housing including a first surface oriented in a first direction, a second surface oriented in a second direction opposite to the first direction, and a side surface at least partially surrounding the space between the first surface and the second surface, a base ring located adjacent to an edge area of the first surface and rotatably mounted on the housing, a first ornamental ring detachably mounted on the base ring and configured to rotate relative to the housing together with the base ring, and an interference member configured to perform a linearly reciprocating motion between a first position and a second position closer to the second surface than the first position, the interference member being located adjacent to the base ring and the first ornamental ring. At the second position, the interference member may be configured to maintain or fix the base ring in a stationary state relative to the housing by being at least in partial contact with the base ring. Various other embodiments are possible.

18 Claims, 16 Drawing Sheets

(56) References Cited

U.S. PATENT DOCUMENTS

| | | | |
|---|---|---|---|
| 2017/0048994 A1* | 2/2017 | Lee | G04B 19/286 |
| 2017/0277125 A1 | 9/2017 | Jung et al. | |
| 2018/0307333 A1* | 10/2018 | Lim | G04R 20/02 |
| 2019/0012004 A1* | 1/2019 | Kim | G06F 3/0481 |
| 2019/0204790 A1* | 7/2019 | Kim | G04G 9/007 |
| 2021/0007233 A1 | 1/2021 | Lee | |

FOREIGN PATENT DOCUMENTS

| | | |
|---|---|---|
| KR | 10-2018-0119324 A | 11/2018 |
| KR | 10-2019-0100808 A | 8/2019 |
| KR | 10-2019-0119718 A | 10/2019 |

OTHER PUBLICATIONS

Korean Examination Report dated Sep. 13, 2024, issued in Korean Application No. 10-2020-0067383.

\* cited by examiner

ELECTRONIC DEVICE INCLUDING DETACHABLE ORNAMENTAL MEMBER

CROSS-REFERENCE TO RELATED APPLICATION(S)

This application is based on and claims priority under 35 U.S.C. § 119(a) of a Korean patent application number 10-2020-0067383, filed on Jun. 4, 2020, in the Korean Intellectual Property Office, the disclosure of which is incorporated by reference herein in its entirety.

BACKGROUND

1. Field

The disclosure relates to an electronic device. More particularly, the disclosure relates to an electronic device including a detachable ornamental member.

2. Description of Related Art

As the degree of integration of electronic devices has increased and super-high-speed and large-capacity wireless communication has become popular, various functions have recently come to be provided in a single electronic device, such as a mobile communication terminal. For example, various functions, such as an entertainment function (e.g., a game function), a multimedia function (e.g., a music/video reproducing function), a communication and security function for mobile banking, a schedule management function, or an e-wallet function, are integrated in a single electronic device, in addition to a communication function.

In recent years, wearable electronic devices have come to be commercialized, and the use of electronic devices provided with various functions, such as an electronic wallet function, a medical/health care function, and a communication function, while having the appearance of a wrist watch, is being popularized. A wearable electronic device, which is used in the state of being worn on a user's body, may be used as an accessory for expressing the individuality of the user. A user may express his or her individuality by wearing an electronic device decorated in a manner of purchasing an aftermarket product and attaching the aftermarket product to the electronic device.

The above information is presented as background information only to assist with an understanding of the disclosure. No determination has been made, and no assertion is made, as to whether any of the above might be applicable as prior art with regard to the disclosure.

SUMMARY

When an aftermarket product is additionally mounted on the exterior of an electronic device, the wearability of the electronic device may deteriorate. For example, the volume or weight of the electronic device in the worn state may increase. A binding member, commonly referred to as a "band", may be provided as a means to enable the electronic device to be worn on a user's body such as a wrist or ankle. Such a binding member is becoming a representative aftermarket product because the binding member is directly replaceable by the user without affecting the volume or weight of an electronic device in the worn state. However, in an electronic device, the parts that can be directly replaced by a user are limited to several components such as a binding member, and it may be difficult to satisfy a user's various tastes. Some users may replace or modify even parts other than the binding member so as to satisfy the tastes thereof. However, when an ordinary user directly replaces or modifies a part of the electronic device, the operation performance of the electronic device may be deteriorated or the normal operation of the electronic device may not be possible.

Aspects of the disclosure are to address at least the above-mentioned problems and/or disadvantages and to provide at least the advantages described below. Accordingly, an aspect of the disclosure is to provide an electronic device implemented so as to allow a user to directly replace some parts of the appearance of the electronic device without affecting the operating performance of the electronic device.

Additional aspects will be set forth in part in the description which follows and, in part, will be apparent from the description, or may be learned by practice of the presented embodiments.

In accordance with an aspect of the disclosure, an electronic device is provided. The electronic device includes a housing including a first surface oriented in a first direction, a second surface oriented in a second direction opposite to the first direction, and a side surface at least partially surrounding the space between the first surface and the second surface, a base ring located adjacent to an edge area of the first surface and rotatably mounted on the housing, a first ornamental ring detachably mounted on the base ring and configured to rotate relative to the housing together with the base ring, and an interference member capable of performing a linearly reciprocating motion between a first position and a second position closer to the second surface than the first position, the interference member being located adjacent to the base ring and the first ornamental ring. At the second position, the interference member may be configured to maintain or fix the base ring in a stationary state relative to the housing by being at least in partial contact with the base ring.

In accordance with another aspect of the disclosure, an electronic device is provided. The electronic device includes a housing including a first surface in which a display is disposed, a second surface facing away from the first surface, and a side surface at least partially surrounding a space between the first surface and the second surface, a base ring having a shape surrounding at least a portion of the first surface and rotatably mounted on the housing, a first ornamental ring disposed to surround at least a portion of the first surface, mounted on the base ring by magnetic force, and rotating relative to the housing together with the base ring, a guide member fixed to the housing and configured to restrain the base ring to the housing in a rotatable state, and a second ornamental ring disposed to surround at least a portion of the first surface and mounted on the housing to be capable of performing a linearly reciprocating motion between a first position and a second position. At the second position, the second ornamental ring may be configured to maintain or fix the base ring in a stationary state on the housing by being at least in partial contact with the base ring, and the magnetic force between the base ring and the first ornamental ring may vary when the first ornamental ring rotates relative to the base ring.

In an electronic device according to various embodiments disclosed herein, it is possible to implement various appearances by including an ornamental member, for example, an ornamental ring (or an ornamental member wheel) detachably provided on an appearance of the electronic device. In an electronic device according to various embodiments, since it is easy to separate or replace an ornamental member, it is possible to implement various changes in the appearance of the electronic device. Thus, the electronic device is useful for expressing the individuality of a user, while preventing damage to the electronic device in the process of separation or replacement.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
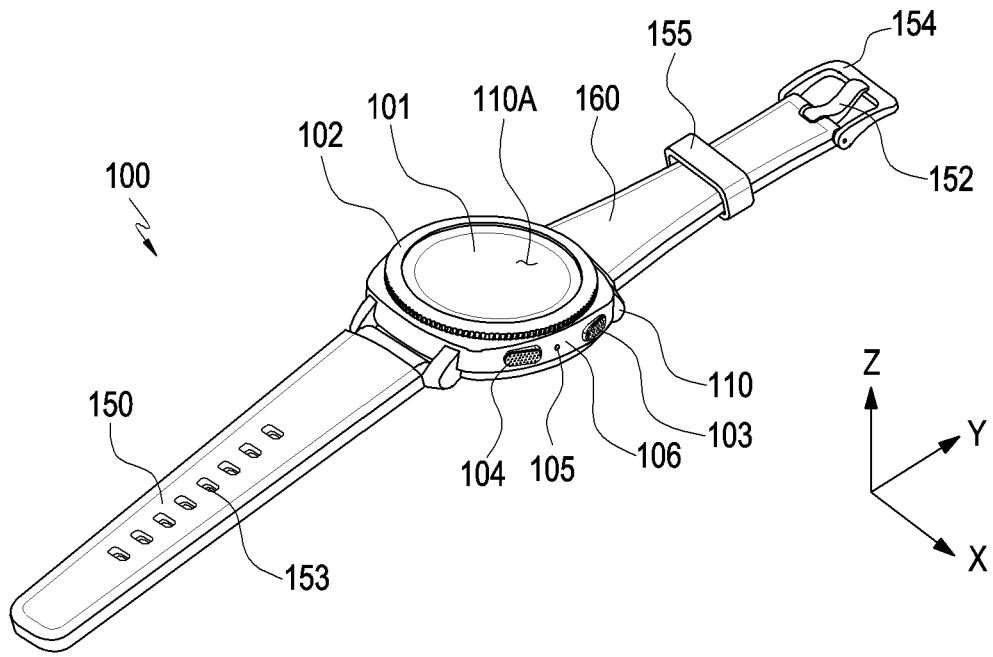
FIG. 1 is a perspective view illustrating a front side of an electronic device according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program) including one or more instructions that are stored in a storage medium (e.g., internal memory or external memory) that is readable by a machine (e.g., the electronic device). For example, a processor (e.g., the processor) of the machine (e.g., the electronic device) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

FIG. 1 is a perspective illustrating the front side of an electronic device according to an embodiment of the disclosure.

Figure 2:
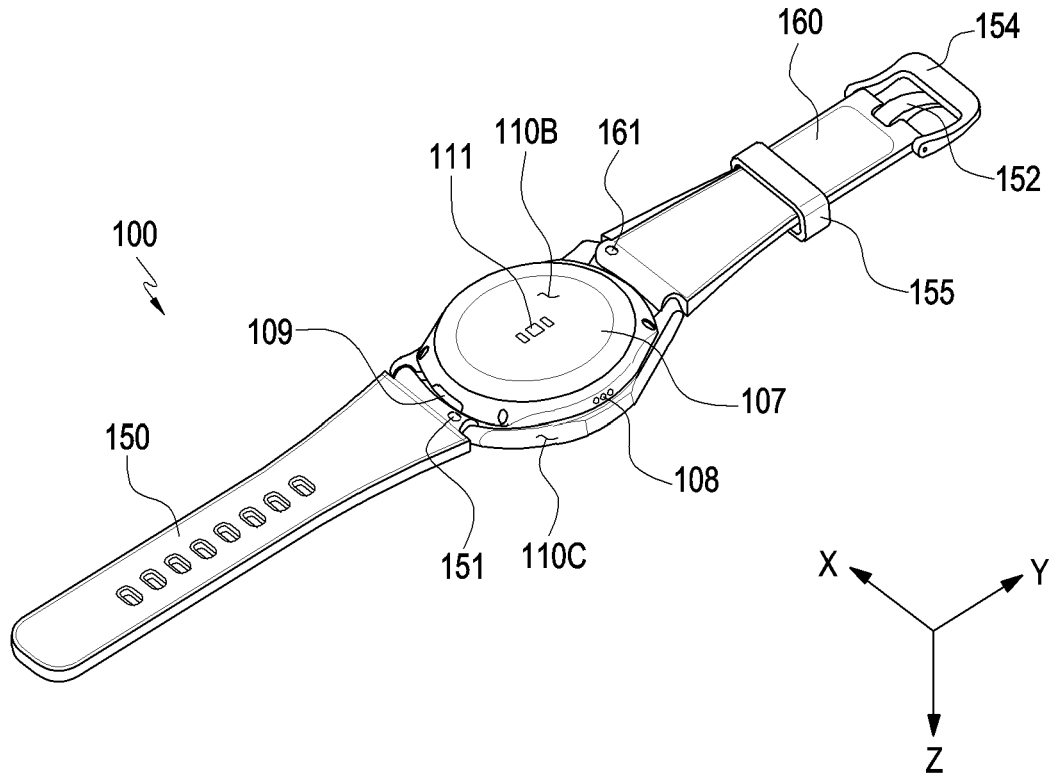
FIG. 2 is a perspective view illustrating the rear side of an electronic device of FIG. 1 according to an embodiment of the disclosure.

FIG. 2 is a perspective view illustrating a rear side of an electronic device of FIG. 1 according to an embodiment of the disclosure.

Referring to FIGS. 1 and 2, an electronic device 100 according to an embodiment may include: a housing 110 including a first surface (or a front surface) 110A, a second surface (or a rear surface) 110B, and a side surface 110C surrounding the space between the first surface 110A and the second surface 110B; and binding members 150 and 160 each connected to at least a portion of the housing 110 and configured to removably bind the electronic device 100 on a portion of a user's body (e.g., a wrist or an ankle). In another embodiment (not illustrated), the term "housing" may mean a structure forming some of the first surface 110A, the second surface 110B, and the side surface 110C of FIG. 1. According to an embodiment, at least a portion of the first surface 110A may be defined by a substantially transparent front plate 101 (e.g., a glass plate or a polymer plate including various coating layers). The second surface 110B may be defined by a substantially opaque rear plate 107. The rear plate 107 may be made of, for example, coated or colored glass, ceramic, a polymer, or metal (e.g., aluminum, stainless steel (STS), or magnesium), or a combination of two or more of these materials. The side surface 110C may be defined by a side bezel structure (or a "side member") 106 coupled to the front plate 101 and the rear plate 107 and including a metal and/or a polymer. In some embodiments, the rear plate 107 and the side bezel structure 106 may be integrally formed, and may include the same material (e.g., a metal material such as aluminum). The binding members 150 and 160 may be made of various materials and in various shapes. A plurality of integrated-type unit links may be disposed to be movable with respect to each other using a woven material, leather, rubber, urethane, metal, ceramic, or a combination of at least two of these materials.

According to an embodiment, the electronic device 100 may include at least one of a display (e.g., the display device 293 in FIG. 3), audio modules 105 and 108, a sensor module 111, key input devices 102,103, and 104, and a connector hole 109. In some embodiments, in the electronic device 100, at least one of the components (e.g., the key input devices 102, 103, and 104, the connector hole 109, or the sensor module 111) may be omitted, or other components may be additionally included.

The display (e.g., the display 293 in FIG. 3) is positioned to substantially face the first surface, and may be visually exposed through, for example, a substantial portion of the front plate 101 (e.g., the area surrounded by a base ring 202, a first ornamental ring 205, or a second ornamental ring 204 to be described later). For example, the screen display area of the display 293 may be defined as an area surrounded by a wheel key 102 in FIG. 1, and may be visually exposed through the front plate 101. The shape of the display 293 may have a shape corresponding to the shape of the front plate 101, and may have various shapes such as a circle, an ellipse, and a polygon. The display 293 may be coupled to or disposed adjacent to a touch sensing circuit, a pressure sensor capable of measuring touch intensity (pressure), and/or a fingerprint sensor.

The audio modules 105 and 108 may include a microphone hole 105 and a speaker hole 108. The microphone hole 105 may include a microphone disposed therein so as to acquire external sound, and in some embodiments, multiple microphones may be disposed therein so as to enable detection of the direction of sound. The speaker hole 108 may be used for an external speaker and a phone call receiver. In some embodiments, the speaker hole 108 and the microphone hole 105 may be implemented as a single hole, or a speaker may be included without the speaker hole 108 (e.g., a piezo speaker).

The sensor module 111 may generate electrical signals or data values corresponding to the internal operating states or the external environmental states of the electronic device 100. The sensor module 111 may include, for example, a biometric sensor module 111 (e.g., a heart rate monitoring (HRM) sensor) disposed on the second surface 110B of the housing 110. The electronic device 100 may further include at least one of sensor modules (not illustrated in the drawings), such as a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or an illuminance sensor.

The key input devices 102, 103, and 104 may include a wheel key 102 disposed on the first surface 110A of the housing 110 and configured to be rotatable in at least one direction, and/or side key buttons 103 and 104 disposed on the side surface 110C of the housing 110. The wheel key 102 may have a shape corresponding to the shape of the front plate 101. In another embodiment, the electronic device 100 may not include some or all of the above-mentioned key input devices 102, 103, and 104, and a key input device 102, 103, or 104 not included in the electronic device 100 may be implemented in another form, such as a soft key on the display 293.

The connector hole 109 may accommodate a connector (e.g., a universal serial bus (USB) connector) configured to transmit/receive power and/or data to/from an external electronic device, and may include another connector hole (not illustrated) capable of accommodating a connector configured to transmit/receive an audio signal to/from an external electronic device. The electronic device 100 may further include, for example, a connector cover (not illustrated), which covers at least a portion of the connector hole 109 and blocks inflow of external foreign matter into the connector hole.

Each of the binding members 150 and 160 may be detachably fastened to at least a portion of the housing 110 using a locking member 151 or 161. Each of the binding members 150 and 160 may include at least one of a fixing member 152, fixing member fastening holes 153, a band guide member 154, and a band fixing ring 155.

The fixing member 152 may be configured to fix the housing 110 and the binding members 150 and 160 to a portion of the user's body such as a wrist or an ankle. The fixing member fastening holes 153 allow the housing 110 and the binding members 150 and 160 to be fixed to a portion of the user's body in cooperation with the fixing member 152. The band guide member 154 is configured to limit the movement range of the fixing member 152 when the fixing member 152 is fastened to any of the fixing member fastening holes 153, thereby ensuring that the binding members 150 and 160 are brought into close contact with and bound on the user's body part. The band fixing ring 155 is capable of limiting the movement range of the binding members 150 and 160 in the state in which the fixing member 152 and the fixing member fastening hole 153 are fastened to each other.

Figure 3:
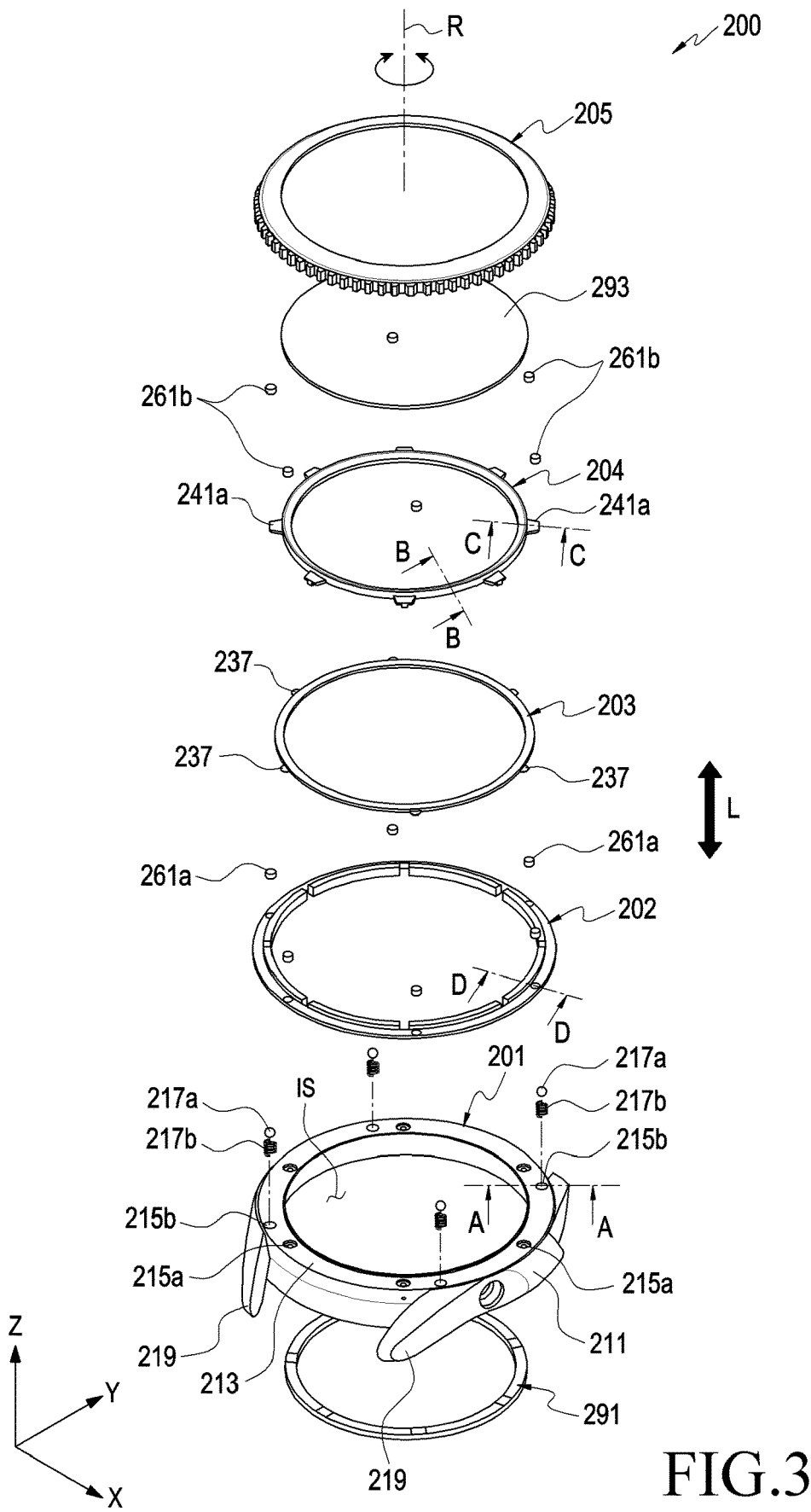
FIG. 3 is an exploded perspective view illustrating a part of an electronic device according to an embodiment of the disclosure.

FIG. 3 is an exploded perspective view illustrating a part of an electronic device (e.g., the electronic device 100 in FIG. 1) according to an embodiment of the disclosure.

According to various embodiments disclosed herein, in an electronic device 200, at least a portion of a wheel key 102 provided as an input device may be utilized as an ornamental member. The electronic device 200 may include at least one of a display 293 accommodated in a housing 201 (e.g., the housing 110 in FIG. 1), at least one antenna, a support member, a battery, or a printed circuit board. For brevity of the figure, at least some of these components may be omitted in FIG. 3. For example, FIG. 3 generally illustrates the configuration related to ornamental members or an input device (e.g., the wheel key 102 in FIG. 1) of the electronic device 200, and it is noted that the disclosure is not limited thereto.

Referring to FIG. 3, the electronic device 200 may include a base ring 202, a first ornamental ring 205, and a second ornamental ring 204 disposed in a housing 201 (e.g., the housing 110 in FIG. 1), in which the first ornamental ring 205 may be detachably mounted on the base ring 202. Among the base ring 202, the first ornamental ring 205, and the second ornamental ring 204, at least the base ring 202 and the first ornamental ring 205 may be defined as a part of the wheel key 102 in FIG. 2. According to various embodiments, the housing 201 may include a front plate (e.g., the front plate 101 in FIG. 1) and/or a rear plate (e.g., the rear plate 107 in FIG. 2). In some embodiments, the housing 201 may further include a configuration that is exposed as the appearance of the electronic device 200, for example, the wheel key 102.

According to various embodiments, the housing 201 includes at least a part of a side bezel structure (e.g., the side bezel structure 106 in FIG. 1), and may be provided as a structure that defines the inner space IS of the electronic device 200. For example, the housing 201 may have a ring shape or a cylinder shape having open top and bottom ends. Although omitted in FIG. 3, the front plate 101 of FIG. 1 and/or the rear plate 107 of FIG. 2 are coupled to the housing 201 so as to separate the internal space (IS) of the electronic device 200 (e.g., the electronic device 100 in FIG. 1) from the external space. In some embodiments, the internal space IS may be connected to the external space of the electronic device 200 through the microphone hole 105, the speaker hole 108, or the connector hole 109 in FIG. 1 or 2. For example, in a specific embodiment, it is described that "the internal space IS of the electronic device 200 or the housing 201 is separated from the external space", but this need not be interpreted as "complete sealing or isolation".

The display 293 may be disposed on the inner surface of the front plate 101 and may be disposed to face a printed circuit board with a support member (not illustrated) interposed therebetween. For example, since the display 293 is disposed in a space separated from the printed circuit board by the support member, the support member may not be in direct contact with the printed circuit board. According to an embodiment, the support member may be connected to the housing 201 in the inner space IS or may be configured integrally with the housing 201. A processor, a memory, and/or an interface may be mounted on the printed circuit board. The processor may include, for example, at least one of a central processing unit, an application processor, a graphics processing unit (GPU), a sensor processor, or a communication processor.

The memory may include, for example, a volatile memory or a nonvolatile memory. The interface may include, for example, a high-definition multimedia interface (HDMI), a USB interface, a secure digital (SD) card interface, and/or an audio interface. The interface may electrically or physically connect, for example, the electronic device 100 to an external electronic device, and may include a USB connector, an SD card/multimedia card (MMC) connector, or an audio connector.

The battery is a device for supplying power to at least one component of the electronic device 200, and may include, for example, a non-rechargeable primary battery, a rechargeable secondary battery, or a fuel cell. At least a portion of the battery may be disposed on substantially the same plane as, for example, the printed circuit board. The battery may be integrally disposed inside the electronic device 200, or may be detachably disposed on the electronic device 200.

The antenna may be disposed between the display and the support member and/or between the printed circuit board and the rear plate 107. The antenna may include, for example, a near field communication (NFC) antenna, a wireless charging antenna, and/or a magnetic secure transmission (MST) antenna. For example, the antenna may enable short-range communication with an external device, wireless transmission/reception of power used for charging, or transmission of a short-range communication signal or a magnet-based signal including payment data. In another embodiment, an antenna structure may be configured with a portion of the housing 201, a portion of the support member, or a combination thereof.

According to various embodiments, the housing 201 is made of, for example, a material containing a metal and/or a polymer, and, as mentioned above, may be used as a radiation conductor at least partially transmitting and receiving a radio signal. In an embodiment, the housing 201 may include multiple (e.g., two pairs of) coupling arms 219 extending from the side surface 211 (e.g., the side surface 110C in FIG. 2). The coupling arms 219 may be used as, for example, a structure for mounting binding members (e.g., the binding members 150 and 160 in FIG. 1 or FIG. 2). The top surface 213 of the housing 201 may provide a substantially closed curve, for example, a ring-shaped plane, and may include multiple fixing holes 215a and multiple bearing holes 215b. As will be described later, the fixing holes 215a may provide a means for fixing a guide member 203, and the bearing holes 215b may be used as spaces for placing balls 217a and/or first elastic members 217b. For example, the electronic device 200 may further include a guide member 203, balls 217a, and/or first elastic members 217b, and the fixing holes 215a and/or the bearing holes 215b may provide structures in which the guide member 203, the balls 217a, and/or the first elastic members 217b may be mounted or disposed. In some embodiments, the fixing holes 215a or the bearing holes 215b may be arranged at specified angular intervals in the circumferential direction of the housing 201. The number and arrangement intervals of the fixing holes 215a or bearing holes 215b may be variously changed depending on the actual size of the electronic device 200 or the specifications of the electronic device 200.

According to various embodiments, the first elastic members 217b may include coil springs, and may be accommodated in the bearing holes 215b. The balls 217a are accommodated in the bearing holes 215b, and may receive the elastic force of the first elastic members 217b. For example, the balls 217a may be provided with elastic force acting in a direction away from the bearing holes 215b. As will be described later, while the base ring 202 is rotating, the balls 217a may rub against the base ring 202, and may generate a click feeling according to the structure or shape of the base ring 202.

According to various embodiments, the base ring 202 has a shape substantially corresponding to the top surface 213 of the housing 201, and may be disposed to surround an area close to the edge of the first surface (e.g., the first surface 110A in FIG. 1). In an embodiment, the base ring 202 may be located in an area close to the edge of the top surface 213 of the housing 201, and may rotate in the circumferential direction. In some embodiments, a controller of the electronic device 200, for example, a processor, may generate an input signal based on a rotation angle or rotation speed of the base ring 202. For example, the user may rotate the base ring 202 to perform a specified function. For example, the user may move or select a function menu of the electronic device 200 using the base ring 202.

According to various embodiments, the first ornamental ring 205 may be detachably attached to the base ring 202 in the state of surrounding at least a portion of the first surface (e.g., the first surface 110A in FIG. 1). For example, the first ornamental ring 205 may rotate with respect to the electronic device 200 and/or the housing 201 together with the base ring 202. In some embodiments, the first ornamental ring 205 may form the wheel key 102 of FIG. 1 together with the base ring 202, and various patterns or colors may be provided on the outer surface so as to provide an ornamental effect on the appearance of the electronic device 200 or the housing 201.

According to various embodiments, the electronic device 200 (e.g., the electronic device 100 in FIG. 1) may further include one or more magnets 261a and 261b. For example, if the first ornamental ring 205 is made of a material having magnetic properties, the first ornamental ring 205 may be detachably mounted to the base ring 202 by placing at least one first magnet 261a on the base ring 202. The at least one first magnet 261a may be attached to the base ring 202 using, for example, an adhesive member. According to an embodiment, the electronic device 200 may include multiple first magnets 261a positioned on the base ring 202 and multiple second magnets 261b positioned on the first ornamental ring 205, and the second magnets 261b may generate an attractive force together with the first magnet 261a. For example, the first ornamental ring 205 may be mounted on the base ring 202 at a position where the second magnets 261b face the first magnets 261a.

According to various embodiments, the multiple first magnets 261a and/or the multiple second magnets 261b may include a natural magnet, samarium, scandium, yttrium, neodymium, ferrite, alnico, or a combination of one or more thereof. According to another embodiment, at least one of the multiple first magnets 261a and/or the multiple second magnets 261b may be a steel structure (e.g., an iron plate, an iron bar, an iron wire, an iron pipe, or an iron bracket). According to various embodiments, the multiple first magnets 261a may be bonded to the base ring 202 using an adhesive member (e.g., an adhesive or double-sided tape). According to an embodiment, the multiple second magnets 261b may be bonded to the base ring 202 using an adhesive member (e.g., an adhesive or double-sided tape).

According to various embodiments, the first ornamental ring 205 may be moved or rotated with respect to the base ring 202, and the attractive force generated between the second magnets 261b and the first magnets 261a in this movement or rotation operation may cause the first ornamental ring 205 to be moved or mounted toward the base ring 202. In another embodiment, when the first ornamental ring 205 is rotated in the state in which the first ornamental ring 205 is mounted on the base ring 202, the magnetic force between the base rings 202 and the first ornamental rings 205, for example, the attractive force generated by the first magnets 261a and the second magnets 261b may be changed. For example, when the first ornamental ring 205 rotates with respect to the base ring 202, the distance between the first magnets 261a and the second magnets 261b may vary, and the magnetic force may become stronger or weaker depending on the distance between the first magnet 261a and the second magnet 261b. According to various embodiments, the intensity of at least one of the multiple first magnets 261a and/or the multiple second magnets 261b may be 800 to 5000 gauss. For example, the intensity of the at least one first magnet 261a disposed on the base ring 202 may be equal to or greater than that of the at least one second magnet 261b disposed on the first ornamental ring 205. In another embodiment, the intensity of the first magnet 261a may be less than that of the second magnet 261b.

In the illustrated embodiment, a configuration in which six first magnets 261a and six second magnets 261b are respectively disposed along the circumferential direction is illustrated. For example, the first magnets 261a may be mounted on the base ring 202 in the circumferential direction at 60-degree angular intervals, and the second magnets 261b may be mounted on the first ornamental ring 205 in the circumferential direction at 60-degree angular intervals. Since the first ornamental ring 205 is mounted on the base ring 202 by the attractive force of the first magnets 261a and the second magnets 261b, the second magnets 261b may be positioned to substantially face at least one of the first magnets 261a in the mounted state.

In the embodiment illustrated in FIG. 3, a structure in which the first ornamental ring 205 is mounted on the base ring 202 by magnetic force is illustrated, it is noted that various embodiments are not limited thereto. For example, the base ring 202 and the first ornamental ring 205 are provided with a snap-fit structure in which a hook and a hook recess are combined, or the first ornamental ring 205 may be mounted on the base ring 202 via an adhesive member.

According to various embodiments, the guide member 203 may be mounted on or fixed to the housing 201 so as to restrain the base ring 202 to the electronic device 200 or the housing 201 in a rotatable state. The configuration of the guide member 203 will be described with further reference to FIGS. 4 and 5.

Figure 4:
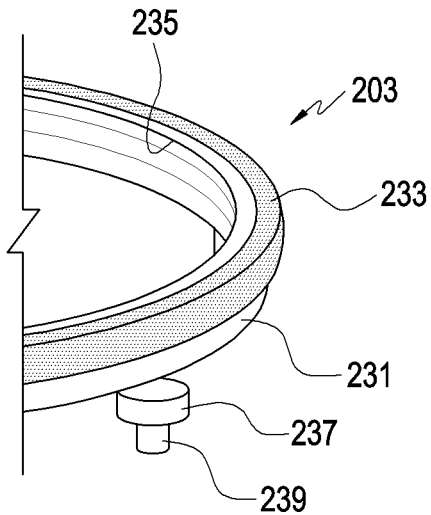
FIG. 4 is a perspective view illustrating a guide member of an electronic device according to an embodiment of the disclosure.

FIG. 4 is a perspective view illustrating a guide member of an electronic device (e.g., the electronic device 100 in FIG. 1) according to an embodiment of the disclosure.

Figure 5:
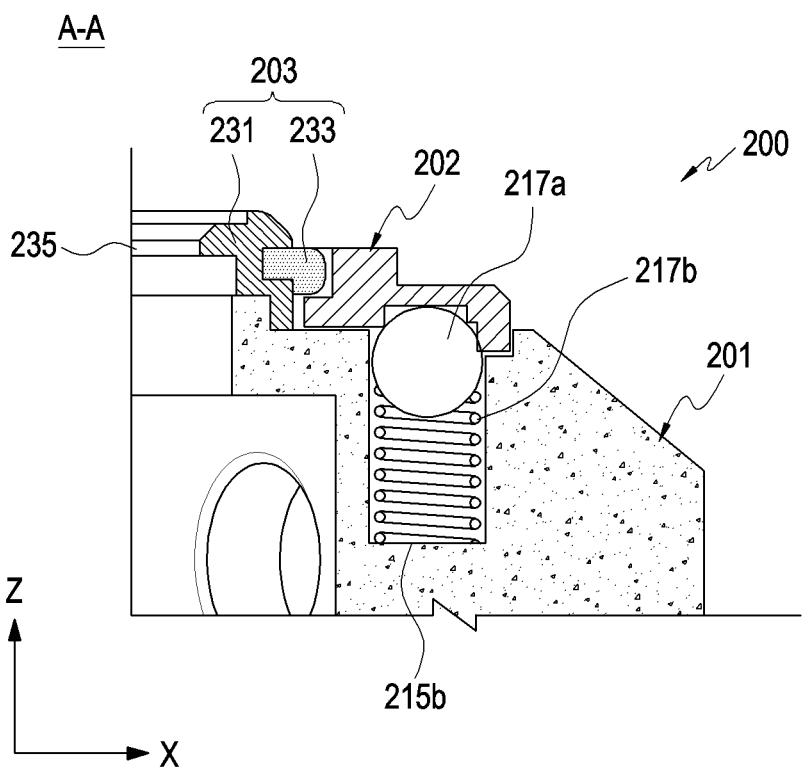
FIG. 5 is a cross-sectional view illustrating a configuration of an electronic device in a state in which a base ring is mounted on a housing according to an embodiment of the disclosure.

FIG. 5 is a cross-sectional view illustrating a configuration of an electronic device (e.g., the electronic device 100 in FIG. 1) in the state in which a base ring is mounted on a housing according to an embodiment of the disclosure.

Referring to FIG. 5, for example, a cross section obtained by cutting a portion of the electronic device 200 along line A-A in FIG. 3.

Referring to FIGS. 4 and 5 together with FIG. 3, the guide member 203 may include a fixing ring 231 and a rubbing ring 233, and the fixing ring 231 may include one or more fixing pieces 237 extending from the outer circumferential surface thereof. The fixing ring 231 may be made of substantially the same material as the housing 201, for example, a metal material or a non-metal material (e.g., a polymer). The fixing ring 231 may be disposed inward from the top surface 213 of the housing 201, and the fixing pieces 237 may be positioned corresponding to the fixing holes 215a. A fixing protrusion 239 may protrude from one surface of each fixing piece 237, and the fixing pieces 237 and/or the fixing protrusions 239 may be substantially accommodated in the fixing holes 215a. In an embodiment, the fixing ring 231 may be fixedly positioned on the housing 201 through a method such as bonding or welding. For example, the guide member 203 may be fixed to the housing 201 through welding in the state in which the fixing pieces 237 and/or the fixing protrusions 239 are accommodated in the fixing holes 215a.

According to various embodiments, the rubbing ring 233 protrudes from the outer surface of the fixing ring 231, and is formed over the entire circumferential direction of the fixing ring 231 so as to form a closed curve. In an embodiment, the rubbing ring 233 may be made of a material different from that of the fixing ring 231, for example, a polymer such as polyoxymethylene (POM), and the rubbing ring may be lubricative while having mechanical strength and durability. In a configuration made of a polymer, the rubbing ring 233 may be mounted on the fixing ring 231 simultaneously with being molded through a process such as insert injection molding. According to an embodiment, the rubbing ring 233 may be positioned to face a portion of the top surface of the base ring 202. For example, a portion of the base ring 202 may be located between the top surface 213 of the housing 201 and the rubbing ring 233. As a result, in the thickness direction Z, the base ring 202 may be substantially restrained between the guide member 203 (e.g., the rubbing ring 233) and the housing 201, and may be rotated in the circumferential direction while being supported or guided by the top surface 213 of the housing 201 and/or the rubbing ring 233.

According to various embodiments, in the state in which the base ring 202 and/or the guide member 203 are mounted on the housing 201, the balls 217a may be in close contact with the bottom surface of the base ring 202. For example, while the base ring 202 is rotating, the balls 217a rub against the base ring 202, thereby limiting the rotational speed of the base ring 202 to some extent. When the base ring 202 functions as an input device (e.g., the wheel key 102 in FIG. 1), the frictional force provided by the balls 217a creates an environment that makes fine adjustment of the base ring 202 easier. The base ring 202 may receive the elastic force of the first elastic members 217b via the balls 217a, and may be in close contact with the rubbing ring 233 by the elastic force of the first elastic members 217b. For example, even if the use time of the electronic device 200 increases or the number of rotations of the base ring 202 is accumulated, the frictional force acting when the base ring 202 rotates can be maintained.

According to various embodiments, the electronic device 200 may further include a guide protrusion 235 formed on the guide member 203 (e.g., the fixing ring 231). The guide protrusion 235 has a shape protruding inward from the fixing ring 231, and may surround or define a portion of the internal space IS. In an embodiment, the guide protrusion 235 may be formed substantially over the entire circumferential direction on the inner side of the fixing ring 231 and may form a closed curve. As will be described later, the guide protrusion 235 is capable of limiting the range in which the second ornamental ring 204 performs a linearly reciprocating motion L while restraining the second ornamental ring 204 to the housing 201.

According to various embodiments, the second ornamental ring 204 is located close to, for example, the base ring 202 and/or the first ornamental ring 205, and may be disposed on the housing 201 to be capable of performing a linearly reciprocating motion L. The configuration of the second ornamental ring 204 will be described with further reference to FIGS. 6 to 10.

Figure 6:
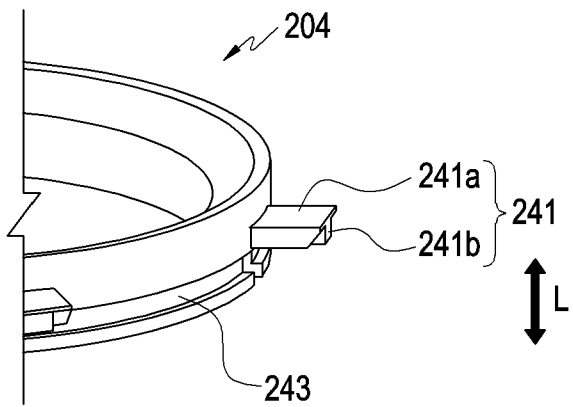
FIG. 6 is a perspective view illustrating a second ornamental ring of an electronic device according to an embodiment of the disclosure.

FIG. 6 is a perspective view illustrating a second ornamental ring of an electronic device (e.g., the electronic device 100 in FIG. 1) according to an embodiment of the disclosure.

Figure 7:
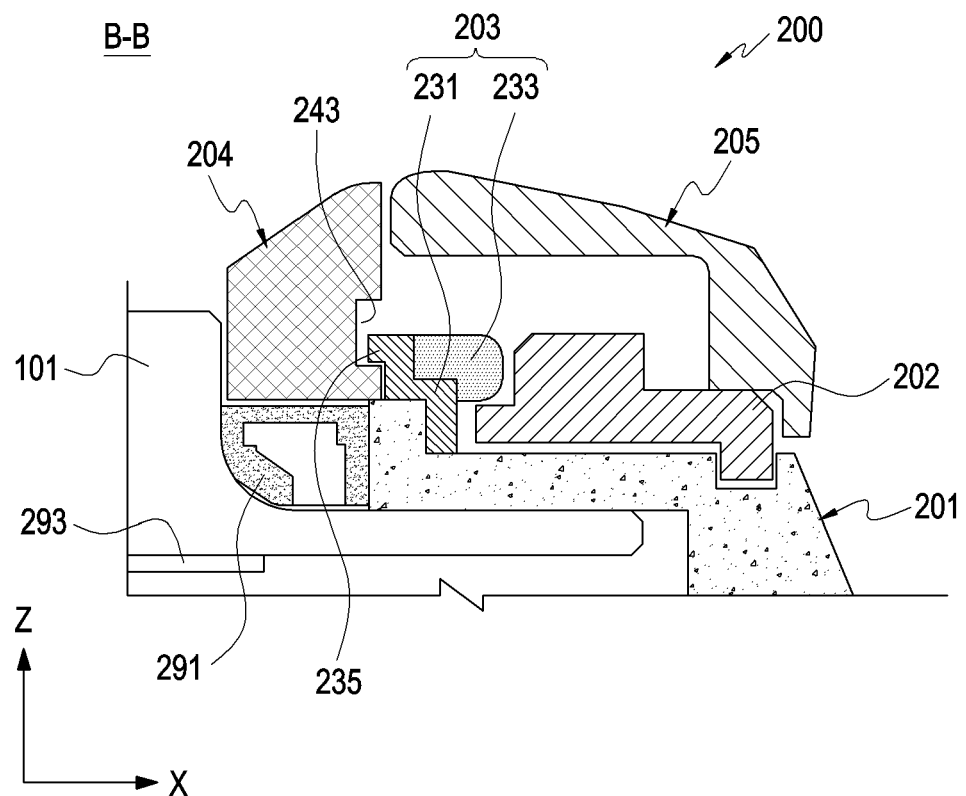
FIG. 7 is a cross-sectional view illustrating a configuration of an electronic device in a state in which ornamental rings are mounted according to an embodiment of the disclosure.

FIG. 7 is a cross-sectional view illustrating a configuration of an electronic device in a state in which ornamental rings are mounted according to an embodiment of the disclosure.

Figure 8:
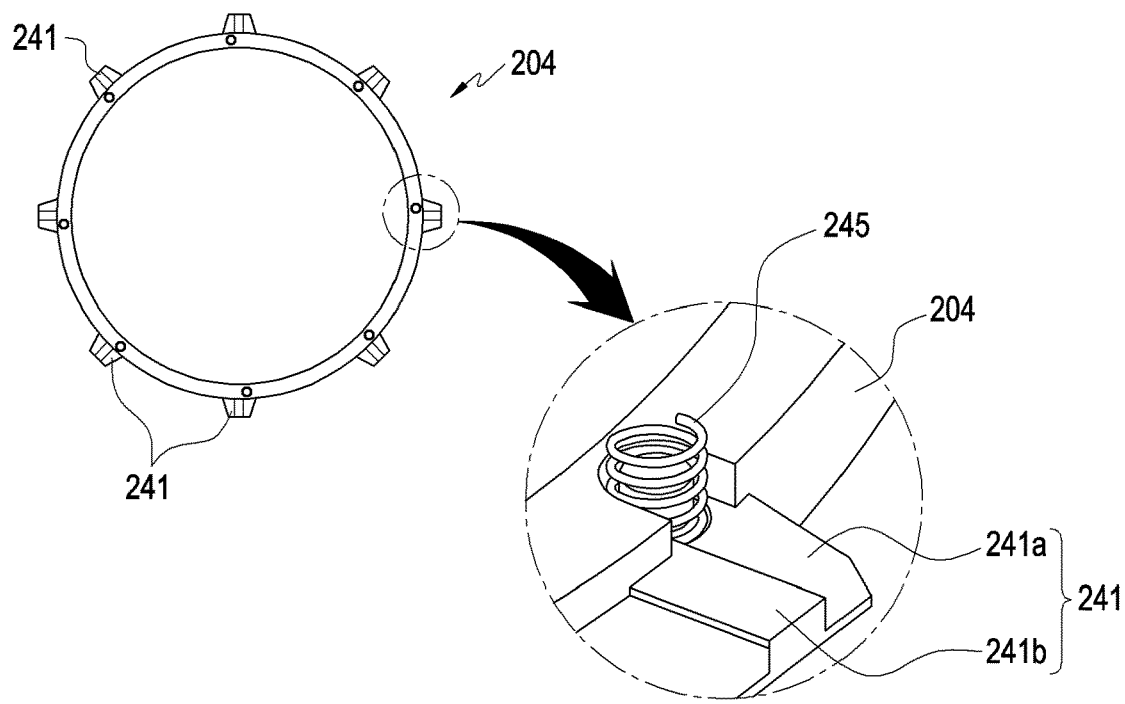
FIG. 8 is a bottom view illustrating a second ornamental ring of an electronic device according to an embodiment of the disclosure.

FIG. 8 is a bottom view illustrating a second ornamental ring of an electronic device according to an embodiment of the disclosure.

Figure 9:
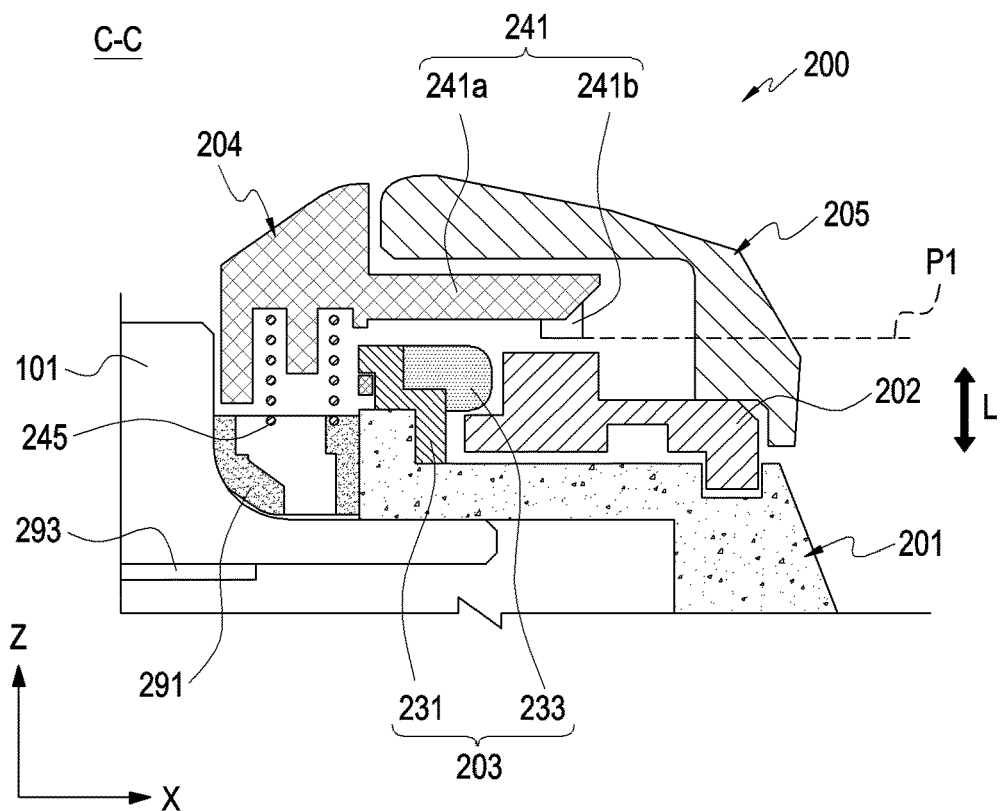
FIG. 9 is a cross-sectional view illustrating the configuration of an electronic device in another state in which ornamental rings are mounted according to an embodiment of the disclosure.

FIG. 9 is a cross-sectional view illustrating a configuration of an electronic device in the state in which the ornamental rings are mounted according to an embodiment of the disclosure.

Figure 10:
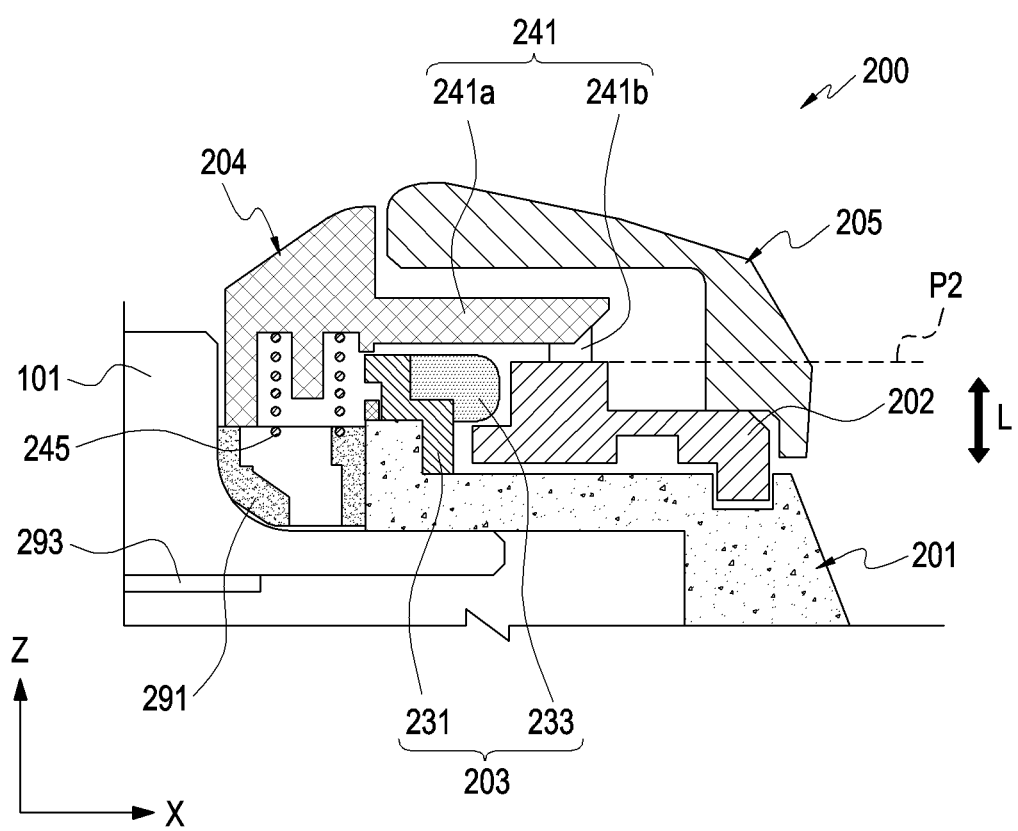
FIG. 10 is a cross-sectional view illustrating a configuration in a state in which a second ornamental ring of FIG. 9 is moved to a second position according to an embodiment of the disclosure.

FIG. 10 is a cross-sectional view illustrating a configuration in a state in which a second ornamental ring of FIG. 9 is moved to a second position according to an embodiment of the disclosure.

Figure 11:
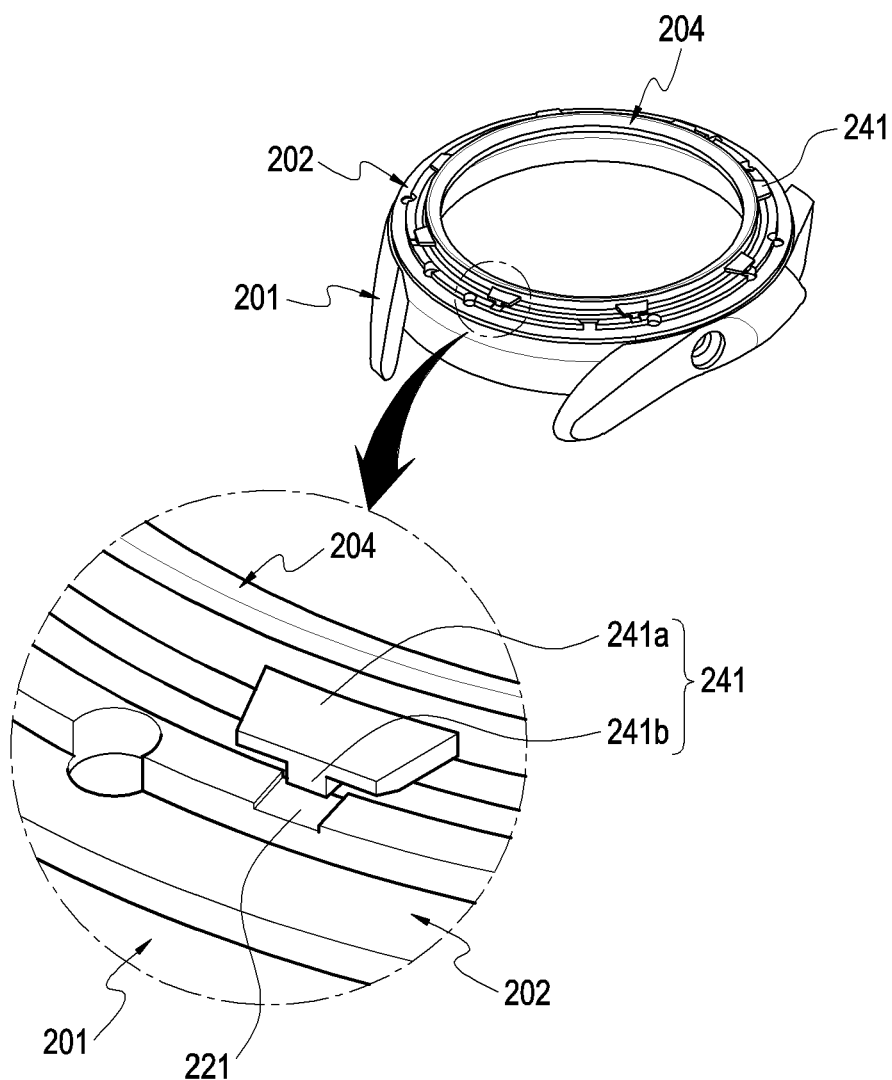
FIG. 11 is a perspective view illustrating a stopper structure in an electronic device according to an embodiment of the disclosure.

FIG. 11 is a perspective view illustrating a stopper structure in an electronic device according to an embodiment of the disclosure herein.

Referring to FIG. 7, for example, a cross section obtained by cutting a portion of the electronic device 200 along line B-B in FIG. 3. Each of FIGS. 9 and 10 illustrates, for example, a cross section obtained by cutting a portion of the electronic device 200 along line C-C in FIG. 3.

Referring to FIGS. 6 to 11 together with FIG. 3, the second ornamental ring 204 may be disposed to surround at least a portion of the first surface (e.g., the first surface 110A in FIG. 1), and may be disposed on the electronic device 200 or the housing 201 in the state of being capable of performing a linearly reciprocating motion L between a first position (e.g., the first position P1 in FIG. 9) and a second position (e.g., the second position P2 in FIG. 10). The second position P2 may be, for example, a position closer to a second surface (e.g., the second surface 110B in FIG. 2) than the first position P1. In an embodiment, the first ornamental ring 205 may be disposed to surround or to be in contact with the second ornamental ring 204. For example, when the base ring 202 rotates, the first ornamental ring 205 may rub against the second ornamental ring 204 while rotating together with the base ring 202.

According to various embodiments, the second ornamental ring 204 may perform a linear reciprocating motion L between the first position P1 and the second position P2 in the thickness direction Z. For example, the second position P2 may be a position that is located more inside the internal space IS than the first position P1 in the thickness direction Z. At the second position P2, the second ornamental ring 204 may at least partially be in contact with the base ring 202 and may function as an interference member that limits the rotation of the base ring 202 with respect to the housing 201. For example, at the second position P2, a portion of the second ornamental ring 204 (e.g., the stopper member 241) may be in contact with the base ring 202 or may be partially engaged with the base ring 202 so as to maintain or fix the base ring 202 in a stationary state relative to the housing 201.

Referring to FIGS. 6 and 7, the second ornamental ring 204 may include an avoidance recess 243 in the outer circumferential surface thereof. The avoidance recess 243 has a specified width in the thickness direction Z, and may substantially extend in the outer circumferential surface of the second ornamental ring 204 in the circumferential direction. In an embodiment, a portion of the guide member 203, for example, the guide protrusion 235, is accommodated in the avoidance recess 243 and interferes with opposite ends of the avoidance recess 243 in the thickness direction Z so that the range in which the second ornamental ring 204 performs a linearly reciprocating motion L can be limited. For example, as the guide protrusion 235 interferes with the inner wall of the avoidance recess 243, it is possible for the second ornamental ring 204 to perform a linearly reciprocating motion L in the range between the first position P1 and the second position P2.

According to various embodiments, the electronic device 200 or the housing 201 may further include at least one sealing member 291. The sealing member 291 may be located, for example, between the housing 201 (e.g., the side bezel structure 106 in FIG. 1) and the front plate (e.g., the front plate 101 of FIG. 1), and/or between the housing 201 and the rear plate (e.g., the rear plate 107 of FIG. 2). The sealing member 291 may be configured to block moisture or foreign matter from flowing into a space (e.g., the internal space IS in FIG. 3) surrounded by the housing 201, the front plate 101, and/or the rear plate 107 from the outside.

Referring to FIGS. 8 and 9, the electronic device 200 may further include second elastic members 245 (e.g., springs) that provide elastic force to the second ornamental ring 204. The second elastic members 245 may provide, for example, elastic force that moves the second ornamental ring 204 to the first position P1 or maintains the first position P1 in a stationary state. In an embodiment, the second ornamental ring 204 is movable to the second position P2 by an external force, and when the external force applied to the second ornamental ring 204 is removed, the second ornamental ring 204 is capable of returning to the first position P1 by the elastic force of the second elastic members 245.

Referring to FIG. 6 and FIGS. 8 to 11, the electronic device 200 (e.g., the electronic device 100 in FIG. 1) may further include stopper members 241 extending from the second ornamental ring 204. On the housing 201, the stopper members 241 may be positioned between the base ring 202 and the first ornamental ring 205, and when the second ornamental ring 204 is located at the second position, each stopper member 241 may come into direct contact with the base ring 202 or may be partially engaged with a portion of the base ring 202 (e.g., the stopper recess 221 in FIG. 11). For example, when the second ornamental ring 204 is located at the second position P2, the base ring 202 may be maintained substantially in the state of being fixed on the housing 201.

According to various embodiments, each stopper member 241 includes an extension 241a extending from the outer circumferential surface of the second ornamental ring 204 and a protrusion 241b protruding from the extension 241a. On the housing 201, the extension 241a may be positioned substantially between the base ring 202 and the first ornamental ring 205 across the guide member 203. The protrusion 241b protrudes from one surface of the extension 241a and may be located to substantially face a portion of the base ring 202. When an external force is applied and the second ornamental ring 204 moves to the second position P2, the stopper member 241, for example, the protrusion 241b, may come into contact with the base ring 202 or may be engaged with a stopper recess 221. For example, when the second ornamental ring 204 is located at the second position P2, the stopper member 241 (e.g., the protrusion 241b) may be engaged with a stopper recess 221 so that the base ring 202 can be fixed to the housing 201 and the rotation thereof can be limited.

According to various embodiments, in the state in which the rotation of the base ring 202 on the housing 201 is limited, the first ornamental ring 205 is movable or rotatable relative to the base ring 202. For example, the second magnets 261b may leave the positions at which the second magnets 261b face the first magnets 261a, and at this time, the distance between the first magnets 261a and the second magnets 261b increases, and the magnetic force (e.g., the attractive force) may be weakened. As the attractive force between the first magnets 261a and the second magnets 261b is weakened, the user may easily separate the first ornamental ring 205 from the base ring 202. In some embodiments, the attractive force generated between the first magnets 261a and the second magnets 261b may act substantially in the Z direction. In another embodiment, when an external force (e.g., shear force) that rotates the first ornamental ring 205 relative to the base ring 202 is applied, the first ornamental ring 205 can be easily removed from the base ring 202. The shearing force may substantially act in a vertical direction with respect to the attractive force generated between the first magnets 261a and the second magnets 261b. For example, the user is able to easily separate the first ornamental ring 205 from the base ring 202 by rotating the first ornamental ring 205 relative to the base ring 202 in the state in which the base ring 202 is fixed, rather than applying separating force in the Z direction.

Figure 12:
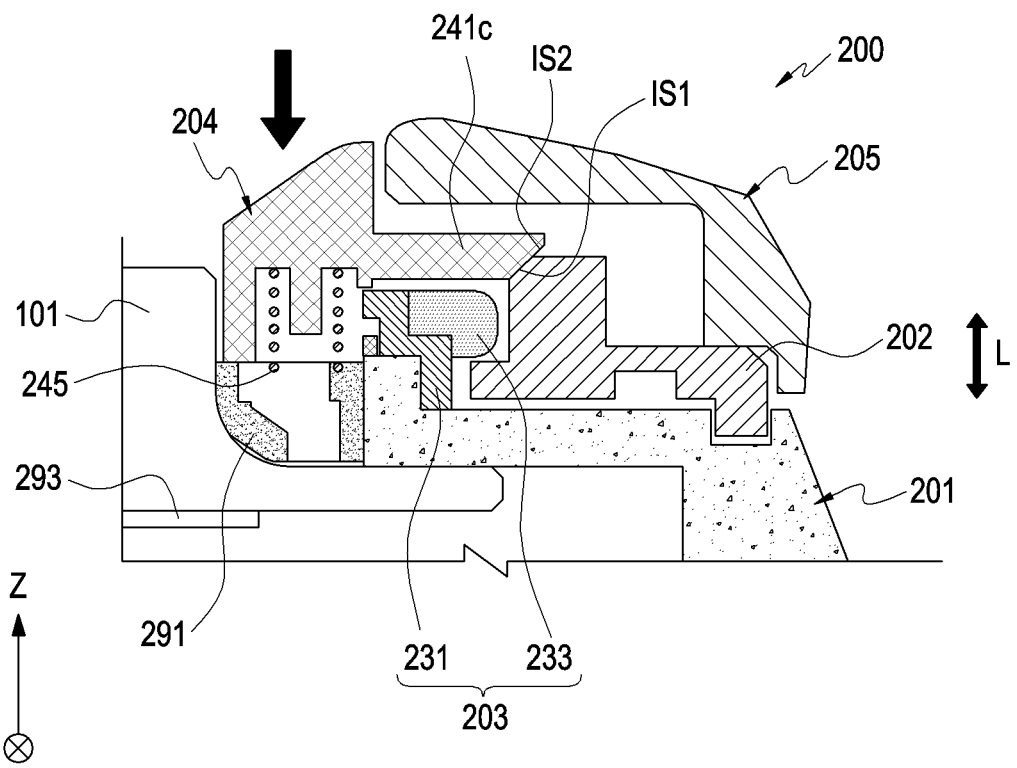
FIG. 12 is a cross-sectional view illustrating a configuration of another stopper structure in an electronic device according to an embodiment of the disclosure.

FIG. 12 is a cross-sectional view illustrating the configuration of another stopper in an electronic device (e.g., the electronic device 100 in FIG. 1) according to an embodiment of the disclosure.

Referring to FIG. 12, the base ring 202 may include a first inclined surface IS1 inclined with respect to the thickness direction Z, and a stopper member (e.g., the stopper member 241 in FIG. 11) may include an extension 241c including a second inclined surface IS2. For example, the extension 241c may include a second inclined surface IS2 corresponding to the first inclined surface IS1 without including the protrusion 241b of FIG. 11. In an embodiment, when the second ornamental ring 204 is located at the second position (e.g., the second position P2 in FIG. 10), the second inclined surface IS2 may be in contact with the first inclined surface IS1 or may press the base ring 202, thereby limiting the rotation of the base ring 202 relative to the housing 201. When the applied external force is removed, the second ornamental ring 204 can be returned to the first position (e.g., the first position P1 of FIG. 9) by the elastic force of the second elastic member 245.

Figure 13:
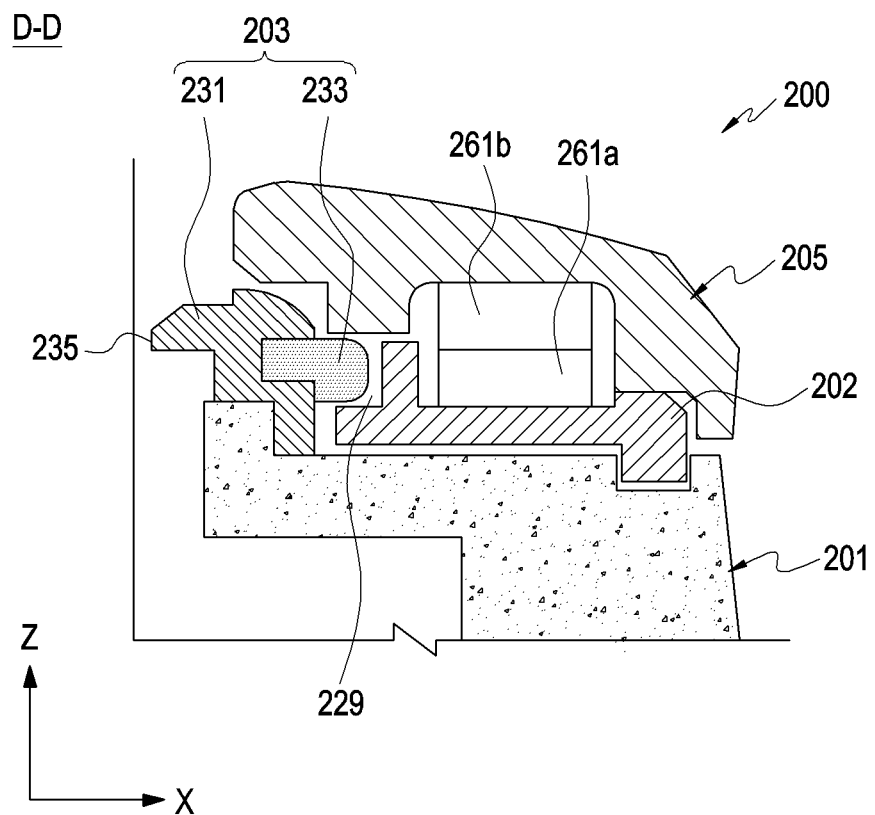
FIG. 13 is a cross-sectional view illustrating a configuration of a structure on which a first ornamental ring is mounted in an electronic device according to an embodiment of the disclosure.

FIG. 13 is a cross-sectional view illustrating the configuration of a structure on which the first ornamental ring 205 is mounted in the electronic device 200 (e.g., the electronic device 100 in FIG. 1) according to an embodiment of the disclosure.

Referring to FIG. 13, for example, a cross section obtained by cutting a portion of an electronic device along line D-D in FIG. 3.

Referring to FIG. 13, when the first ornamental ring 205 is coupled to the base ring 202, the second magnet 261b may be substantially disposed to face the first magnet 261a. The attractive force generated between the magnets 261a and 261b acts in a direction in which the magnets 261a and 261b are in direct contact or close contact with each other, but even when the first ornamental ring 205 is mounted on the base ring 202, the first magnet 261a and the second magnet 261b may be maintained in the state in which the first magnet 261a and the second magnet 261b are not in close contact with each other. For example, in the state in which the first ornamental ring 205 is mounted on the base ring 202, a specified gap may be maintained between the first magnet 261a and the second magnet 261b depending on the positions or structures at which the magnets 261a and 261b are disposed on the base ring 202 and the first ornamental ring 205.

According to various embodiments, in the state of being coupled to the base ring 202, the first ornamental ring 205 may be disposed to face a portion of the guide member 203 (e.g., the rubbing ring 233). For example, the rubbing ring 233 may be at least partially accommodated between the base ring 202 and the first ornamental ring 205. According to an embodiment, the wheel key (e.g., the wheel key 102 in FIG. 1) may include a rail recess 229 formed by coupling the base ring 202 and the first ornamental ring 205 to each other, and at least a portion of the rubbing ring 233 may be accommodated in the rail recess 229. For example, the rubbing ring 233 may have a rail shape, which extends substantially in the circumferential direction, and the wheel key (e.g., the base ring 202 and the first ornamental ring 205) can be stably rotated on the housing 201 by including the rail recess 229, which accommodates the rail structure provided by the rubbing ring.

Referring to FIG. 13 along with FIG. 11, at a position where the first magnets 261a and the second magnets 261b face each other (hereinafter, referred to as a "coupling position"), the first ornamental ring 205 is mounted on the base ring 202 and is rotatable with respect to the housing 201 together with the base ring 202. The attractive force generated between the first magnets 261a and the second magnets 261b may be greater than the force used to rotate the base ring 202. Here, when the second ornamental ring 204 is located at the first position P1, the "force used to rotate the base ring" may be a fixing force acting on the base ring 202, for example, a force greater than static friction force. For example, if the second ornamental ring 204 is located at the first position P1, the first ornamental ring 205 is rotatable with respect to the housing 201 together with the base ring 202.

According to various embodiments, when the second ornamental ring 204 is located at the second position P2, the static friction force or fastening force acting on the base ring 202 (e.g., the fastening force between the stopper member 241 and the stopper recess 221) may be greater than the attractive force generated between the first magnets 261a and the second magnets 261b. For example, when a force greater than the attractive force generated between the first magnets 261a and the second magnets 261b acts as a rotational force when the second ornamental ring 204 is located at the second position P2, the first ornamental ring 205 is rotatable relative to the base ring 202 while the base ring 202 remains stationary. When the first ornamental ring 205 rotates relative to the base ring 202, the attractive force generated between the first magnet 261a and the second magnet 261b may be smaller than that generated at the coupling position. In an embodiment, as the attractive force between the first magnets 261a and the second magnets 261b decreases, the first ornamental ring 205 can be easily separated from the base ring 202.

According to various embodiments, since the first ornamental ring 205 is detachably provided to the base ring 202, it is possible for the user to variously decorate the appearance of the electronic device 200. For example, the user may change the appearance of the electronic device 200 by possessing multiple first ornamental rings 205, which have different colors or patterns, respectively, or exchanging a first ornamental ring 205 with one possessed by another user who possesses the same product, and mounting a desired ornamental ring on the electronic device 200 or the housing 201.

Figure 14:
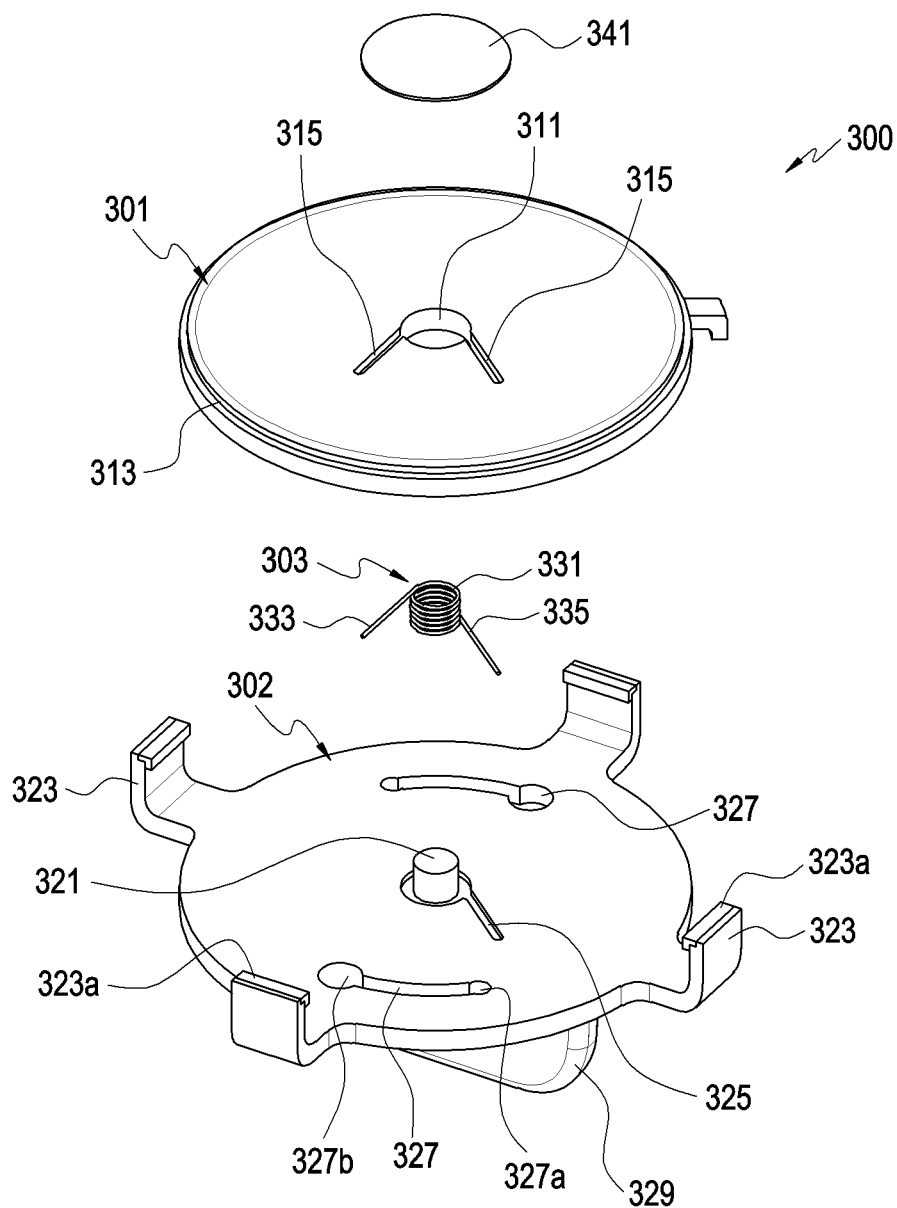
FIG. 14 is an exploded perspective view illustrating a separation tool for an electronic device according to an embodiment of the disclosure.

FIG. 14 is an exploded perspective view illustrating a separation tool for an electronic device (e.g., the electronic device 100 in FIG. 1) according to an embodiment of the disclosure.

Figure 15:
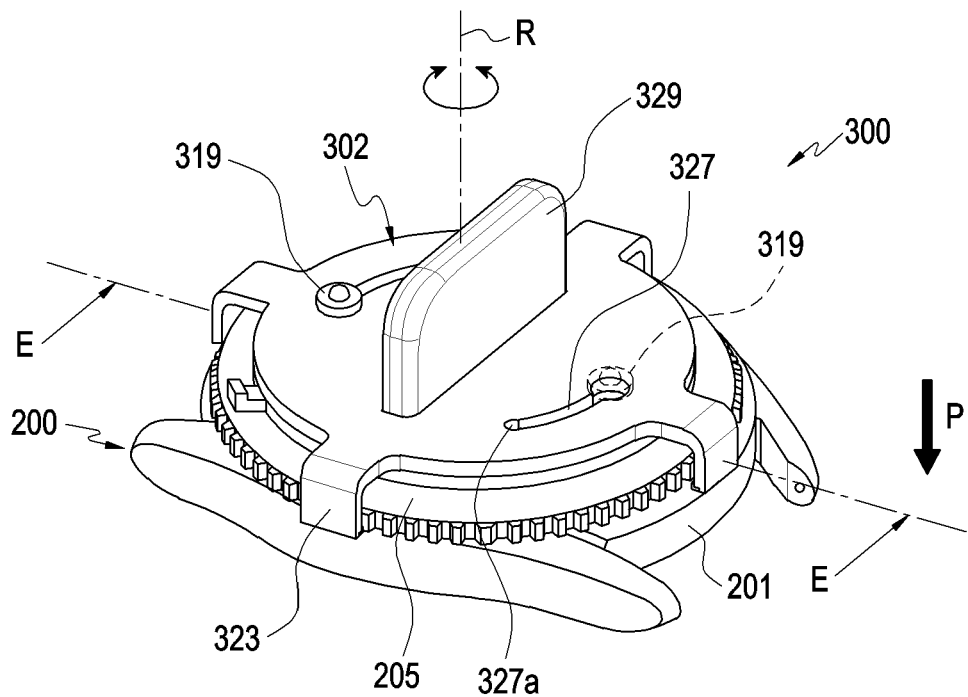
FIG. 15 is a perspective view illustrating a state in which a separation tool for an electronic device is coupled to a housing according to an embodiment of the disclosure.

FIG. 15 is a perspective view illustrating the state in which a separation tool for an electronic device is coupled to a housing according to an embodiment of the disclosure.

Figure 16:
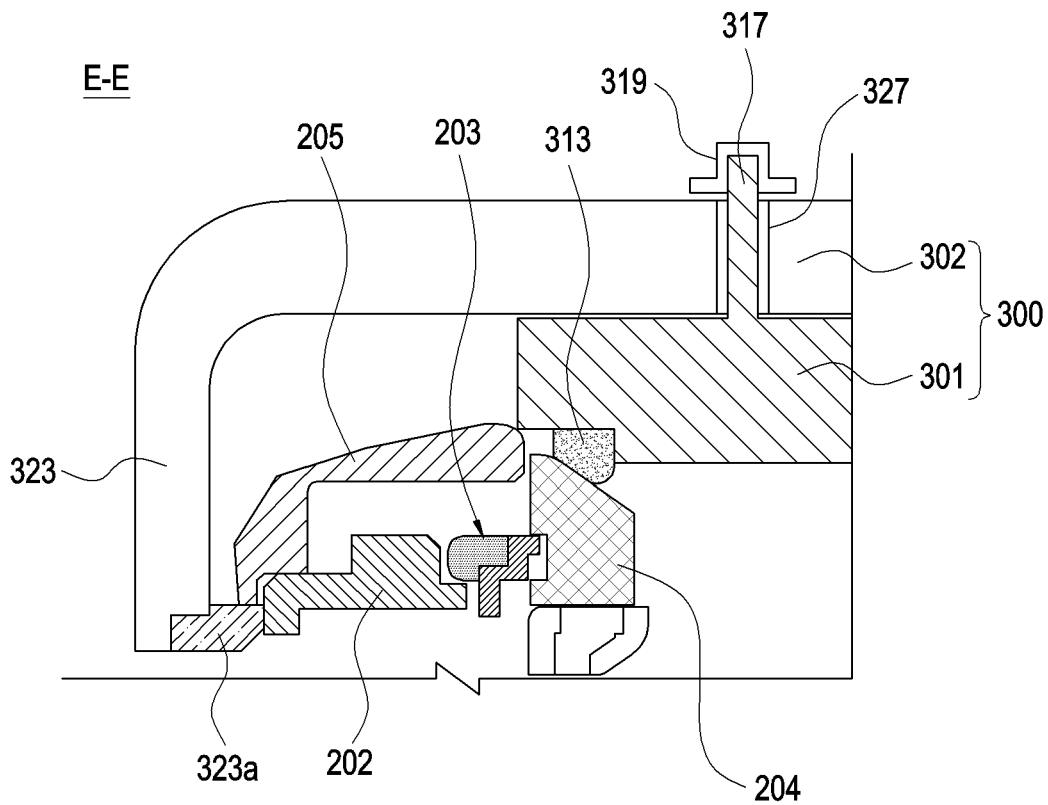
FIG. 16 is a cross-sectional view illustrating a configuration of a separation tool in a state in which a separation tool is coupled to a housing in an electronic device according to an embodiment of the disclosure.

FIG. 16 is a cross-sectional view illustrating a configuration of a separation tool in a state in which a separation tool 300 is coupled to a housing in an electronic device according to an embodiment of the disclosure.

Referring to FIG. 16, for example, a cross section obtained by cutting a portion of the electronic device 200 and the separation tool 300 along line E-E in FIG. 15. If the aforementioned electronic device 200 (e.g., the electronic device 100 in FIG. 1 or FIG. 2) is miniaturized like a wrist watch, it may difficult for the user to move the second ornamental ring 204 to the second position P2 or to rotate the first ornamental ring 205 relative to the base ring 202. According to various embodiments disclosed herein, the electronic device 200 may further include a separation tool 300. Hereinafter, the configuration of the separation tool 300 will be described with reference to the configuration of the electronic device 200 and/or the configuration of the housing 201 of the preceding embodiment.

Referring to FIGS. 14 to 16, the separation tool 300 may include a pressing member 301 and a rotating member 302 coupled to face one surface of the processing member 301 and rotated. The pressing member 301 and the rotating member 302 may be formed as circular plates corresponding to the front plate 101 and the second ornamental ring 204 of the electronic device 200, respectively. According to an embodiment, the pressing member 301 and the rotating member 302 may at least partially include a urethane material or a plastic material.

According to various embodiments, the pressing member 301 may be provided to be coupled in the state of facing the front surface (e.g., the first surface A1 in FIG. 1) of the electronic device 200. In an embodiment, the pressing member 301 may include a rotating hole 311 formed to pass through the central portion thereof and a pressing protrusion 313 protruding along the edge of one surface thereof. In an embodiment, the pressing protrusion 313 may be made of a urethane material. The rotating hole 311 may define a rotating axis R of the rotation member 302 with respect to the pressing member 301 by receiving the rotating protrusion 321 of the rotating member 302. For example, the rotating member 302 may rotate with respect to the pressing member 301 about the rotating hole 311 and/or the rotating protrusion 321. In the state in which the separation tool 300 is coupled to the housing 201, the rotating axis R may substantially coincide with the rotating axis of the wheel key 102 or the base ring 202. The pressing protrusion 313 may be disposed to correspond to the second ornamental ring 204, and when the pressing member 301 is coupled to the housing 201, it is possible to move the second position (e.g., the second position P2 in FIG. 10) by pressing (P) the second ornamental ring 204. For example, the user is able to fix the base ring 202 on the housing 201 by coupling the separation tool 300 to the electronic device 200 or the housing 201.

According to various embodiments, the rotating member 302 may include a rotating protrusion 321 protruding from the surface facing the pressing member 301 and engagement pieces 323 extending from the edge. The rotating protrusion 321 may be accommodated in the rotating hole 311 to provide the rotating center of the rotating member 302. When the separation tool 300 or the pressing member 301 is coupled to the housing 201, the engagement pieces 323 may be engaged with the first ornamental ring 205. For example, each of the engagement pieces 323 may include an engagement protrusion 323a protruding inward from an end thereof, and when the separation tool 300 or the pressing member 301 is coupled to the housing 201, the engagement pieces 323 (e.g., the engagement protrusions 323a) may be engaged with the rotating member 302 in the state of at least partially surrounding the first ornamental ring 205. In some embodiments, the rotating member 302, for example, at least the engagement protrusions 323a, may be made of a urethane material.

According to various embodiments, the separation tool 300 may include a third elastic member 303 and at least one of a first support recess 315 and/or a second support recess 325. The third elastic member 303 may include a coil portion 331 accommodated in the rotating hole 311 in the state of surrounding the rotating protrusion 321, a first fixing arm 333 extending from the coil portion 331, and a second fixing arm 335. In an embodiment, the first fixing arm 333 is supported by the pressing member 301, the second fixing arm 335 is supported by the rotating member 302, and the coil portion 331 is capable of generating elastic force acting in a direction that moves the end of the first fixing arm 333 and the end of the second fixing arm 335 away from each other. For example, the second fixing arm 335 may rotate around the coil portion 331 by the elastic force provided by the coil portion 331.

According to various embodiments, the first support recess 315 extends substantially in a radial direction from the central portion on one surface of the pressing member 301, and accommodates the first fixing aim 333 to fix the same on the pressing member 301. The second support recess 325 is formed adjacent to the rotating protrusion 321 to accommodate the second fixing arm 335, and may extend substantially in a radial direction from the central portion on the one surface of the rotating member 302. For example, in the state in which the coil portion 331 is accommodated in the rotating hole 311, the third elastic member 303 may provide an elastic force for rotating the rotation member 302 relative to the pressing member 301.

According to various embodiments, the separation tool 300 may further include a plate member 341 attached to the pressing member 301. The plate member 341 may be made of, for example, a synthetic resin plate, a metal, or a synthetic resin tape, and may be attached to the inner surface of the rotating member 302 so as to at least partially close the rotating hole 311 or the first support recess 315. According to an embodiment, in the state in which the third elastic member 303 is disposed, the plate member 341 may prevent the coil portion 331 from being separated from the rotating hole 311. In another embodiment, when the third elastic member 303 is disposed on the pressing member 301, the plate member 341 may maintain the first fixing arm 333 in the state of being accommodated in the first support recess 315.

According to various embodiments, the rotating member 302 may include at least one slide hole 327 extending by a specified angle in the circumferential direction at a position spaced apart from the rotating protrusion 321. As will be described later, the slide hole 327 may be utilized as a structure that couples the rotating member 302 to the pressing member 301, and multiple slide holes may be provided according to an embodiment. The slide holes 327 may be formed to penetrate both surfaces of the rotating member 302, and may be disposed symmetrically about the rotating protrusion 321. The separation tool 300 may include slide protrusions 317 protruding from the other surface of the pressing member 301, and the slide protrusions 317 may be accommodated in the slide holes 327. For example, when the rotating member 302 rotates, the slide protrusions 317 move along the slide holes 327, and the rotating range of the rotating member 302 or the moving distance of the slide protrusions 317 are substantially limited by the slide holes 327. For example, the angle range CR in which the rotating member 302 is rotatable may be set by the slide protrusions 317 and the slide holes 327. In an embodiment, one end of each slide protrusion 317 may protrude to the top surface of the rotating member 302. The electronic device 200 (e.g., the electronic device 100 in FIG. 1) or the separation tool 300 may further include a fastening member 319 fastened to the end of each slide protrusion 317, and the fastening member 319 may be supported on the top surface of the rotating member 302. For example, when the fastening members 319 are fastened, the slide protrusions 317 are substantially restrained within the slide holes 327, and the rotating member 302 is capable of being rotated relative to the pressing member 301 while maintaining the state of being coupled to the pressing member 301 by the fastening members 319 and the slide protrusions 317.

According to various embodiments, unless a rotating force is applied from the outside, the slide protrusions 317 may be located at first ends 327a of the slide holes 327. For example, when the slide protrusions 317 are positioned at the first ends 327a in the state of being provided with the elastic force of the third elastic member 303, the rotating member 302 can be maintained in the stationary state with respect to the pressing member 301. In the state illustrated in FIG. 13, unless an external rotating force is not applied, the rotating member 302 receives the elastic force (e.g., a rotating force) of the third elastic member 303 in the counterclockwise direction, but can be maintained in the stationary state because the slide protrusions 317 are in the state of interfering with the first ends 327a.

Figure 17:
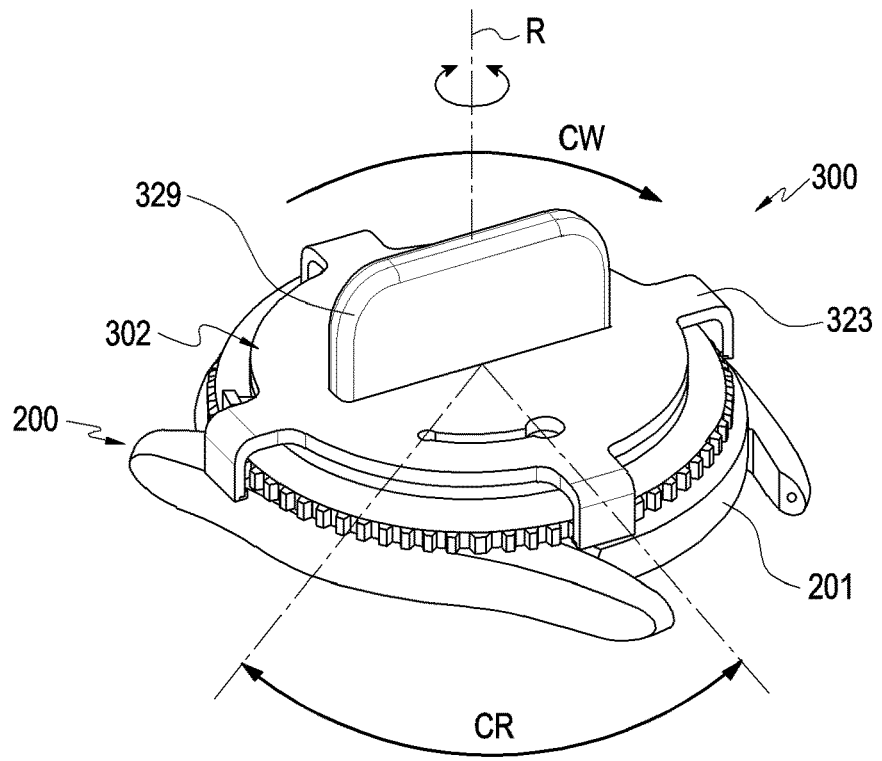
FIG. 17 is a view illustrating an operation of separating a first ornamental ring from an electronic device according to an embodiment of the disclosure.

FIG. 17 is a view illustrating an operation of separating a first ornamental ring from an electronic device (e.g., the electronic device 100 in FIG. 1) according to an embodiment of the disclosure.

Referring to FIG. 17, when the rotating member 302 rotates clockwise (CW) by a rotational force applied from the outside, for example, when the second ornamental ring 204 is located at the second position (e.g., the second position P2 in FIG. 10) in the state in which the pressing member 301 presses the second ornamental ring 204, the slide protrusions 317 can move along the slide holes 327. For example, the user may couple the separation tool 300 to the housing 201 using a handle 329 formed on the outer surface of the rotating member 302, and may easily rotate the rotating member 302 relative to the pressing member 301 in the state in which the separation tool 300 is coupled to the housing 201. Since the second ornamental ring 204 is located at the second position P2, the base ring 202 remains fixed to the electronic device 200 and/or the housing 201, and since the rotating member 302 is engaged with the first ornamental ring 205, the first ornamental ring 205 can be rotated relative to the base ring 202 together with the rotating member 302 when the rotating member 302 rotates relative to the pressing member 301. For example, the second magnets 261b can leave the positions at which the second magnets 261b face the first magnets 261a.

According to various embodiments, the extension length of the slide holes 327, for example, the angular range CR in which the rotating member 302 is capable of rotating relative to the pressing member 301, may correspond to half of the angular interval in which the second magnets 261b and/or the first magnets 261a are arranged. For example, if six first magnets 261a and six second magnets 261b are arranged in the housing 201 illustrated in FIG. 3, the rotating member 302 is capable of rotating in a range of 30 degrees relative to the pressing member 301. In some embodiments, in the state in which the separation tool 300 is coupled to the housing 201, if the first magnets 261a and the second magnets 261b are aligned to face each other, each of the second magnets 261b may be positioned at the center between two adjacent first magnets 261a when the slide protrusions 317 reach the second ends 327b of the slide holes 327. For example, when the slide protrusions 317 reach the second ends 327b of the slide holes 327, the attractive force between the first magnets 261a and the second magnets 261b can be weakened, and the first ornamental ring 205 can be easily separated from the base ring 202. In an embodiment, when the slide protrusions 317 reach the second ends 327b of the slide holes 327, when the separation tool 300 is separated from the housing 201, the first ornamental ring 205 can be easily separated from the base ring 202 and/or the housing 201.

According to various embodiments, since the elastic force of the third elastic member 303 acts in the state where the separation tool 300 is separated from the housing 201, the pressing member 301 and the rotating member 302 are capable of rotating relative to each other and the slide protrusions 317 are capable of moving to the first ends 327a of the slide holes 327. In this way, even in the case of a miniaturized electronic device (e.g., the electronic device 100 in FIG. 1), it is possible for the user to easily separate or replace the first ornamental ring 205 from the base ring 202 or the housing 201 using the separation tool 300.

Figure 18:
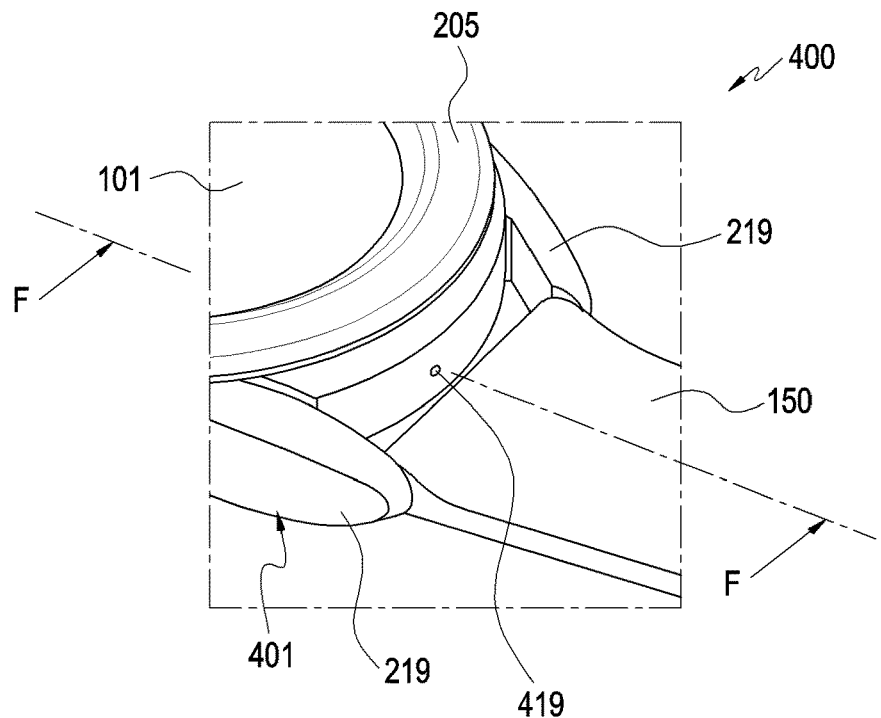
FIG. 18 is a perspective view illustrating a portion of another electronic device according to an embodiment of the disclosure.

FIG. 18 is a perspective view illustrating a portion of another electronic device (e.g., the electronic device 100 or 200 in FIG. 1 or FIG. 3) according to an embodiment of the disclosure.

Figure 19:
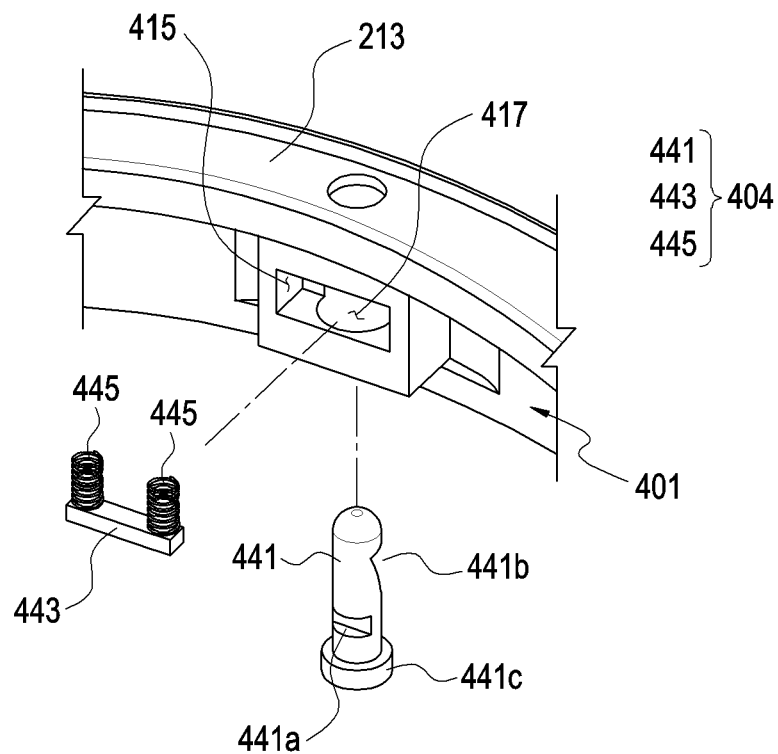
FIG. 19 is an exploded perspective view illustrating a configuration of another interference member in an electronic device according to an embodiment of the disclosure.

FIG. 19 is an exploded perspective view illustrating a configuration of another interference member in an electronic device according to an embodiment of the disclosure.

Figure 20:
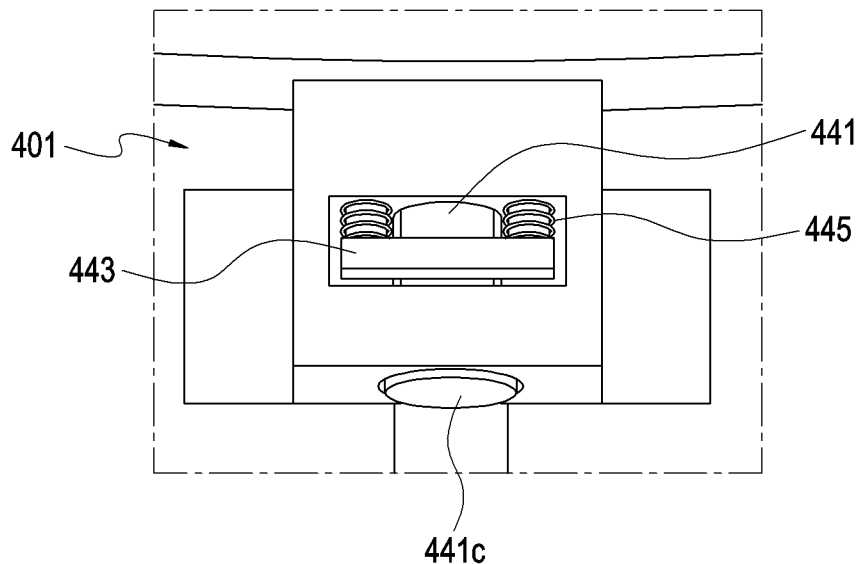
FIG. 20 is a perspective view illustrating a state in which an interference member is arranged in an electronic device according to an embodiment of the disclosure.

FIG. 20 is a perspective view illustrating the state in which an interference member is arranged in an electronic device according to an embodiment of the disclosure.

Figure 21:
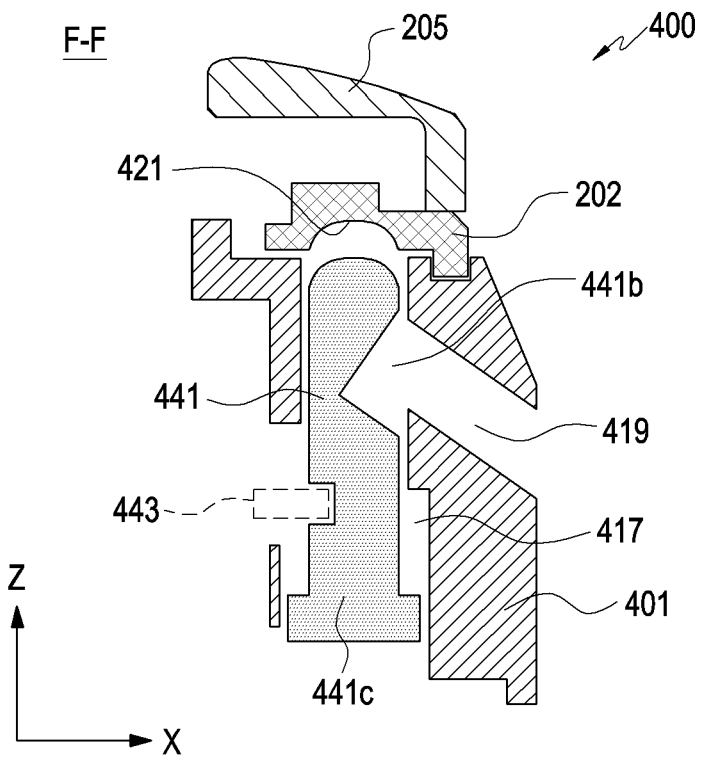
FIG. 21 is a cross-sectional view illustrating a configuration of an interference member in a state in which an interference member is arranged in an electronic device according to an embodiment of the disclosure.

FIG. 21 is a cross-sectional view illustrating a configuration of an interference member in a state in which the interference member is arranged in an electronic device according to an embodiment of the disclosure.

Referring to FIG. 21, for example, a cross section obtained by cutting a portion of an electronic device along line F-F in FIG. 18. In various embodiments disclosed herein, an interference member 404 is a configuration accommodated in a housing 401 (e.g., the housing 201 in FIG. 3), and the second ornamental ring 204 in FIG. 3 may be fixedly installed in the housing 401 or a guide member (e.g., the guide member 203 in FIG. 3) in the electronic device 400. For example, in the electronic device 400 of this embodiment, the second ornamental ring 204 of FIG. 3 may be provided in a structure substantially integrally formed with the guide member 203 of FIG. 3.

Referring to FIGS. 18 to 21, the electronic device 400 may include an operation hole 417 formed on the inner wall of the housing 401 and at least one pin hole 419 formed to penetrate into the operation hole 417 or the internal space (e.g., the internal space IS in FIG. 3) from the side wall of the housing 401. The pin hole 419 may be located in an area between the coupling arms 219 on the side surface 211 of the housing 401, and may be generally concealed by a binding member (e.g., the binding member 150 in FIG. 1 or FIG. 2). Depending on the position of the binding member 150, the pin hole 419 may be concealed by the binding member 150 so as not to be exposed to the outside. According to an embodiment, a pair of pin holes 419 may be formed on the housing 401 so as to be symmetric with respect to each other. The interference member 404 may include, for example, a dummy pin 441 disposed to be capable of performing a linearly reciprocating motion in the housing 401 (or the housing 201 in FIG. 3), and a fourth elastic member 445 configured to provide elastic force to the dummy pin 441.

Figure 22:
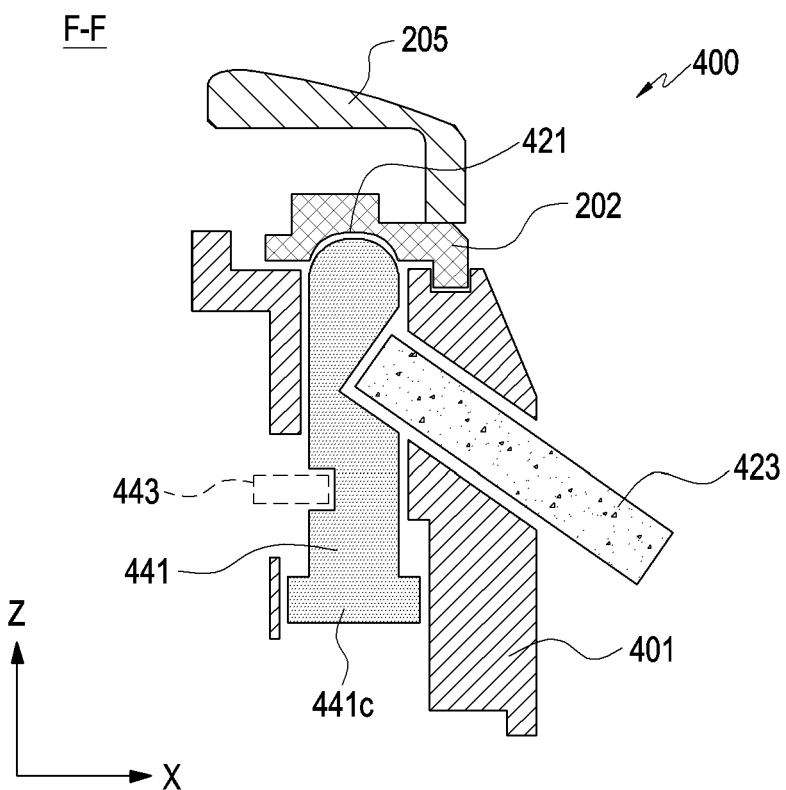
FIG. 22 is a cross-sectional view illustrating the configuration and operation of an interference member in an electronic device according to an embodiment of the disclosure.

According to various embodiments, the dummy pin 441 may be substantially accommodated in the operation hole 417 so as to be capable of performing a linearly reciprocating motion between a third position illustrated in FIG. 21 (e.g., the first position P1 in FIG. 9) and a fourth position in FIG. 22 (e.g., the second position P2 in FIG. 10), and may include a flange 441c provided at one end thereof. In this embodiment, the state in which the dummy pin 441 protrudes to the outside of the housing 401 may be defined as the fourth position, and at the fourth position, the dummy pin 441 may be in contact with the base ring 202 or may be engaged in a dummy recess 421 to be described later. The flange 441c protrudes from, for example, the outer circumferential surface of one end of the dummy pin 441, and interferes with the inner wall of the housing 401 or the stepped wall of the inner wall so that the dummy pin 441 can be prevented from being separated to the outside of the housing 401. The dummy pin 441 may be accommodated in the operation hole 417 in the state in which a portion of the outer circumferential surface thereof corresponds to the pin hole 419. For example, the dummy pin 441 may include a first dummy recess 441a formed to be inclined in a portion of the outer circumferential surface, and when the dummy pin 441 is accommodated in the operation hole 417, the first dummy recess 441a may be disposed to correspond to the pin hole 419. For example, the first dummy recess 441a is disposed to correspond to the pin hole 419, and when an external force is applied to the first dummy recess 441a through the pin hole 419, the dummy pin 441 is capable of moving in a direction in which the dummy pin 441 protrudes from the outer portion of the housing 401 (e.g., the top surface 213 in FIG. 2).

According to various embodiments, one end of the fourth elastic member 445 is supported by the housing 401, and may provide an elastic force in a direction in which the dummy pin 441 is introduced into the housing 401. In this embodiment, the state in which the dummy pin 441 is introduced into the interior of the housing 401 may be defined as the third position, and the base ring 202 does not interfere with the dummy pin 441 at the third position so that the base ring 202 is capable of rotating relative to the housing 401. In an embodiment, the interference member 404 may further include a support piece 443 configured to support the other end of the fourth elastic member 445. The support piece 443 may be mounted in the second dummy recess 441b formed on the dummy pin 441. For example, the fourth elastic member 445 is capable of providing an elastic force in the direction in which the dummy pin 441 is introduced into the housing 401 via the support piece 443. According to an embodiment, an accommodation recess 415 connected to the operation hole 417 may be further provided in the inner wall of the housing 401. A portion of the dummy pin 441, for example, the first dummy recess 441a, may be located on the accommodation recess 415, and the support piece 443 may be engaged in the first dummy recess 441a while being positioned in the accommodation recess 415. In an embodiment, opposite ends of the fourth elastic member 445 may be supported by the inner wall of the accommodation recess 415 and the support piece 443.

According to various embodiments, the electronic device 400 may further include a dummy recess 421 formed on the base ring 202. In some embodiments, multiple dummy recesses 421 may be formed at specified angular intervals in the circumferential direction on the bottom surface of the base ring 202, and the dummy pin 441 may be engaged with any of the dummy recesses 421 in the state of protruding from the top surface (e.g., the top surface 213 in FIG. 3) of the housing 401 (e.g., the second position). Since the dummy pin 441 comes into contact with the base ring 202 or is engaged with the dummy recess 421, it is possible to limit the rotation of the base ring 202 relative to the housing 401. It has been previously described that, when the base ring 202 is maintained or fixed to the housing 401 in a stationary state, it is possible for the user to easily separate the first ornamental ring 205 from the base ring 202 by rotating the first ornamental ring 205.

FIG. 22 is a cross-sectional view illustrating a configuration and operation of an interference member (e.g., the interference member 404 in FIG. 17) in an electronic device (e.g., the electronic device 400 of FIG. 16) according to an embodiment of the disclosure.

Referring to FIG. 22, for example, a cross section obtained by cutting a portion of the electronic device 400 along line F-F in FIG. 18 is illustrated. Referring to FIG. 22, the interference member 404, for example, the dummy pin 441, may move to a fourth position by receiving an external force through an external member 423 introduced through the pin hole 419. For example, the dummy pin 441 may protrude to the outside of the housing 401 to be in contact with the base ring 202 or to be engaged with the dummy recess 421. When the dummy pin 441 protrudes to the outside of the housing 401 to limit the rotation of the base ring 202, it is possible for the user to easily separate the first ornamental ring 205 from the base ring 202. When the external force (e.g., the force applied to the dummy pin 441 via the external member 423) is removed, the elastic force provided by the fourth elastic member 445 is able to move the dummy pin 441 to the third position. Regardless of the position of the dummy pin 441, if the first ornamental ring 205 is in the separated state, the user may select another desired first ornamental ring 205 and mount the first ornamental ring 205 on the base ring 202. Since other second magnets (e.g., the second magnets 261b in FIG. 3) are already disposed on the other first ornamental ring 205, the first ornamental ring 205 can be easily coupled to the base ring 202 by a magnetic force.

Although not illustrated, the electronic device 400 may further include a push button or a slide button provided in the housing 401, and the external member 423 of FIG. 20 may transmit an external force applied to the push button or the slide button to the dummy pin 441. The structure (e.g., the external member 423), which transmits an external force to the dummy pin 441, may be substantially a part of the electronic device 400 even though the structure is referred to as an "external member".

Figure 23:
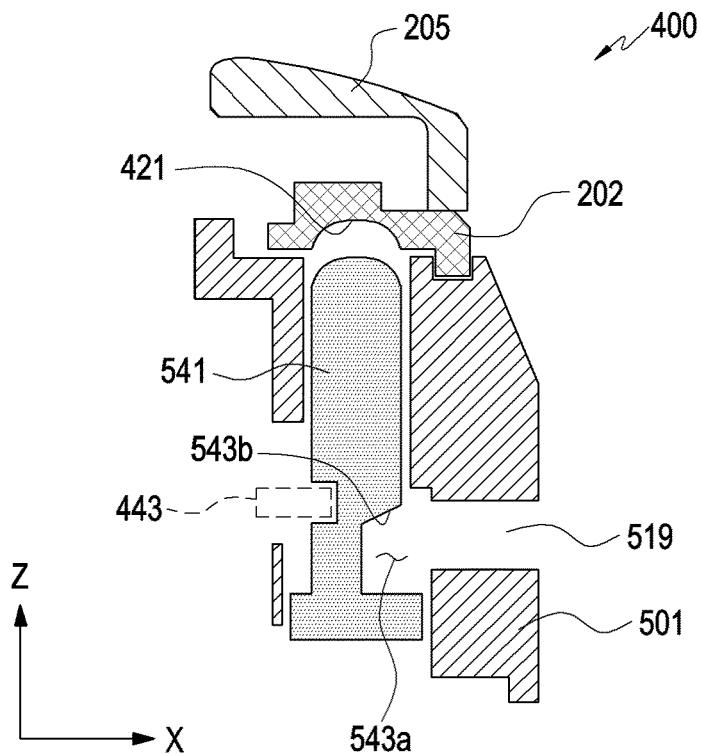
FIG. 23 is a cross-sectional view illustrating a configuration of another interference member in an electronic device according to an embodiment of the disclosure.

FIG. 23 is a cross-sectional view illustrating a configuration of another interference member (e.g., the interference member 404 in FIG. 19) in an electronic device (e.g., the electronic device 100 or 400 of FIG. 1 or FIG. 18) according to an embodiment of the disclosure.

Figure 24:
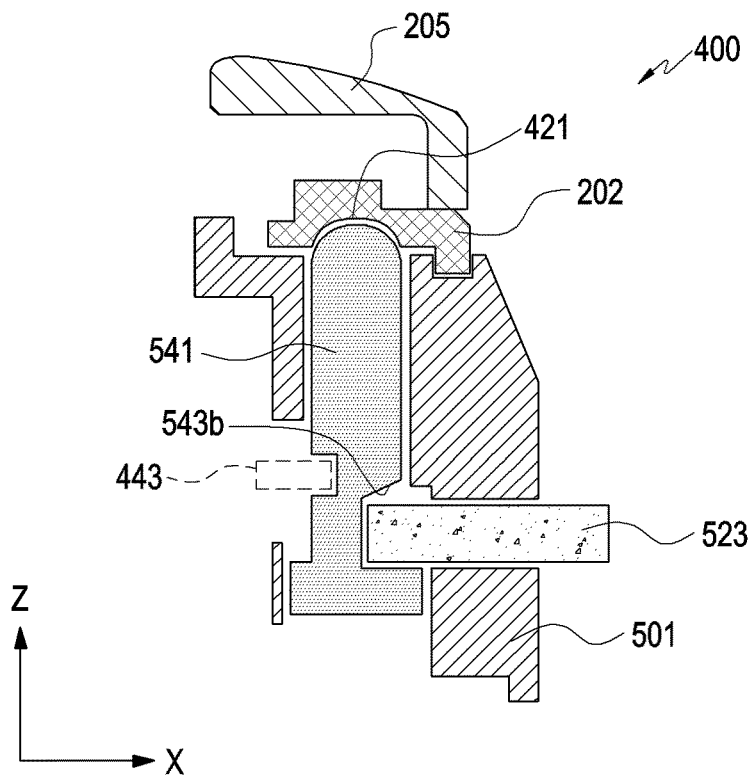
FIG. 24 is a cross-sectional view illustrating a configuration and operation of another interference member in an electronic device according to an embodiment of the disclosure.

FIG. 24 is a cross-sectional view illustrating a configuration and operation of another interference member in an electronic device according to an embodiment of the disclosure.

Referring to FIGS. 23 and 24, a housing 501 (e.g., the housing 201 in FIG. 3) may include a pin hole 519 penetrating the side surface thereof. While the pin hole 419 in FIG. 21 is inclined with respect to the length direction Y or the thickness direction Z, the pin hole 519 of this embodiment may be substantially parallel to the length direction Y. For example, an external member 523 may be substantially inserted into the housing 501 through the pin hole 519 in the longitudinal direction Y. The interference member, for example, the dummy pin 541, may include a third dummy recess 543a disposed to correspond to the pin hole 519. The third dummy recess 543a may provide an inclined surface 543b interfering with the external member 523. The inclined surface 543b may be positioned to substantially face the pin hole 519 at a third position, for example, in the state illustrated in FIG. 23. In an embodiment, as the external member 523 is gradually inserted into the inside of the housing 501 through the pin hole 519, the inclined surface 543b may interfere with the external member 523. For example, the inclined surface 543b may be provided so as to move the dummy pin 541 to the fourth position, for example, the position illustrated in FIG. 24, as the external member 523 interferes with the inclined surface 543b. In the state of being moved to the fourth position, the dummy pin 541 may be in contact with the base ring 202 or may be engaged with the dummy recess 421 in the base ring 202. For example, at the fourth position, the interference member (e.g., the dummy pin 541) is capable of limiting the rotation of the base ring 202.

As describe above with reference to FIGS. 21 and 22 and/or FIGS. 23 and 24, in the structure of limiting the rotation of the base ring 202 using the external member 423 or 523 and/or an interference member, the direction in which the external member 423 or 523 is inserted into the housing 401 or 501 can be variously set. In an actually manufactured electronic device 500 (e.g., the electronic device 100, 200, or 400 of FIG. 1, FIG. 3, or FIG. 18), the shape of the second dummy recess 441b or 543a may be appropriately provided depending on the direction in which the external member 423 or 523 is inserted.

Figure 25:
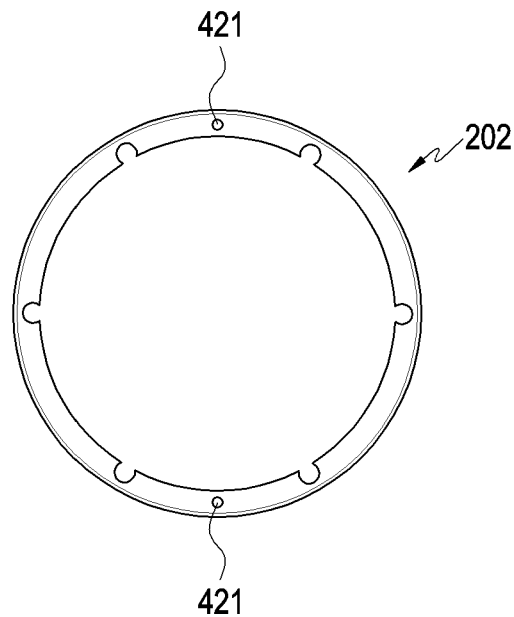
FIG. 25 is a bottom view illustrating another base ring of an electronic device according to an embodiment of the disclosure.

FIG. 25 is a bottom view illustrating another base ring of an electronic device according to an embodiment of the disclosure.

Figure 26:
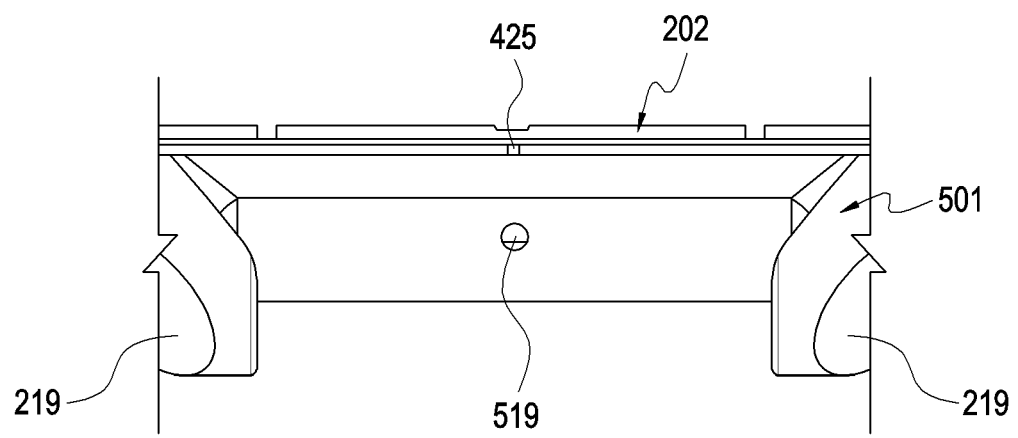
FIG. 26 is a side view illustrating a state in which another base ring is mounted on a housing in an electronic device according to an embodiment of the disclosure.

FIG. 26 is a side view illustrating a state in which another base ring is mounted on a housing in an electronic device according to an embodiment of the disclosure.

Referring to FIGS. 25 and 26, an electronic device (e.g., the electronic device 100, 200, 400, or 500 of FIG. 1, FIG. 3, FIG. 18, or FIG. 23) may include multiple dummy recesses 421 formed on the base ring 202. 421. In some embodiments, the electronic device may include a mark (sign or notice) 425 formed on the base ring 202. The mark 425 may, for example, allow the user to recognize a position at which the dummy recess 421 is aligned with an interference member (e.g., the dummy pin 441 or 541 of FIG. 19 or FIG. 23). In an embodiment, depending on whether or not the mark 425 and the pin hole 519 (e.g., the pin hole 419 in FIG. 18) are aligned with each other, the user is able to recognize the position at which the interference member (e.g., the dummy pin 441 or 541 in FIG. 19 or FIG. 23) can be easily engaged with the dummy recess 421.

According to various embodiments, the position at which the mark 425 is aligned with the microphone hole 105 of FIG. 1 may be set to a position where the protrusion 241b and the stopper recess 221 in FIG. 11 can be easily engaged with each other. For example, among the various embodiments disclosed herein, configurations of different embodiments can be selected and combined so as to implement other embodiments.

As described above, an electronic device (e.g., the electronic device 100, 200, or 400 in FIG. 1, FIG. 3, or FIG. 18) according to various embodiments disclosed herein may include: a housing (e.g., the housing 110, 201, or 401 in FIG. 1, FIG. 3, or FIG. 16) including a first surface (e.g., the first surface 110A in FIG. 1) oriented in a first direction (e.g., the +X direction in FIG. 3), a second surface (e.g., the second surface 110B in FIG. 2) oriented in a second direction (e.g., the –X direction in FIG. 3) opposite to the first direction, and a side surface (e.g., the side surface 110C in FIG. 2) at least partially surrounding the space between the first surface and the second surface; a base ring (e.g., the base ring 202 in FIG. 3) located adjacent to an edge area of the first surface and rotatably mounted on the housing; a first ornamental ring (e.g., the first ornamental ring 205 in FIG. 3) detachably mounted on the base ring and configured to rotate relative to the housing together with the base ring; and an interference member (e.g., the second ornamental ring 204 in FIG. 3 or the interference member 404 in FIG. 19) capable of performing a linearly reciprocating motion between a first position (e.g., the first position P2 in FIG. 9 or the state illustrated in FIG. 21) and a second position (e.g., the second position P2 in FIG. 10 or the state illustrated in FIG. 22) closer to the second surface than the first position, the interference member being located adjacent to the base ring and the first ornamental ring. At the second position, the interference member may be configured to maintain or fix the base ring in a stationary state relative to the housing by being at least in partial contact with the base ring.

According to various embodiments, the interference member may include a second ornamental ring disposed to surround at least a partial area of the first surface.

According to various embodiments, the first ornamental ring may be disposed to surround the second ornamental ring or to be in contact with the second ornamental ring.

According to various embodiments, the electronic device may further include a guide member (e.g., the guide member 203 in FIG. 3) fixed to the housing and configured to restrain the base ring to the housing in a rotatable state.

According to various embodiments, the guide member may include a fixed ring (e.g., the fixed ring 231 in FIG. 5) fixed in the state of being in contact with the housing and a rubbing ring (e.g., the rubbing ring 233 in FIG. 5) provided on the fixed ring and configured to come into contact with the base ring.

According to various embodiments, the electronic device may further include: an avoidance recess (e.g., the avoidance recess 243 in FIG. 6) formed on an outer circumferential surface of the second ornamental ring; and a guide protrusion (e.g., the guide protrusion 235 in FIG. 7) formed on the guide member. The guide protrusion may be accommodated in the avoidance recess so as to limit a range of a linear reciprocating motion of the second ornamental ring.

According to various embodiments, the electronic device may further include a magnet (e.g., the first magnet 261a or the second magnet 261b in FIG. 3) disposed on at least one of the base ring and the first ornamental ring. The first ornamental ring may be mounted on the base ring by an attractive force of the magnet.

According to various embodiments, at the second position, the base ring may be maintained in the stationary state on the housing, and the first ornamental ring may be configured to be rotatable relative to the base ring.

According to various embodiments, the electronic device may further include at least one first magnet disposed on the base ring and at least one second magnet disposed on the first ornamental ring and configured to generate an attractive force with the first magnet. At a position where the first magnet and the second magnet face each other, the first ornamental ring may be mounted on the base ring, and the second magnet may be configured to leave the position where the second magnet faces the first magnet when the first ornamental ring rotates relative to the base ring.

According to various embodiments, the electronic device may further include at least one elastic member (e.g., the second elastic member 245 in FIG. 9) mounted on the housing. The elastic member may be configured to provide an elastic force to the second ornamental ring in a direction in which the second ornamental ring moves to the first position.

According to various embodiments, the electronic device may further include a stopper member (e.g., the stopper member 241 in FIG. 10) extending from the second ornamental ring and a stopper recess (e.g., the stopper recess 221 in FIG. 10) formed on the base ring. At the second position, the stopper member may be selectively engaged with the stopper recess.

According to various embodiments, the interference member may include a dummy pin (e.g., the dummy pin 441 in FIG. 19 or FIG. 20) disposed to be capable of performing a linearly reciprocating motion in the housing, and the dummy pin may be configured to be fixed to the first position by receiving the elastic force and to move to the second position by receiving an external force so as to maintain or fix the base ring in the stationary state.

According to various embodiments disclosed herein, an electronic device may include: a housing (e.g., the housing 110 or 201 in FIG. 1 or 3) including a first surface in which a display is disposed, a second surface facing away from the first surface, and a side surface at least partially surrounding a space between the first surface and the second surface; a base ring (e.g., the base ring 202 in FIG. 3) having a shape surrounding at least a portion of the first surface and rotatably mounted on the housing; a first ornamental ring (e.g., the first ornamental ring 205 in FIG. 3) disposed to surround at least a portion of the first surface, mounted on the base ring by a magnetic force, and configured to rotate relative to the housing together with the base ring; a guide member (e.g., the guide member 203 in FIG. 3) fixed to the housing and configured to restrain the base ring to the housing in a rotatable state; and a second ornamental ring (e.g., the second ornamental ring 204 in FIG. 3) disposed to surround at least a portion of the first surface and mounted on the housing to be capable of performing a linearly reciprocating motion between a first position and a second position. At the second position, the second ornamental ring may be configured to maintain or fix the base ring in a stationary state on the housing by being at least in partial contact with the base ring, and the magnetic force between the base ring and the first ornamental ring may vary when the first ornamental ring rotates relative to the base ring.

According to various embodiments, the electronic device may further include at least one first magnet (e.g., the first magnet 261a in FIG. 3) disposed on the base ring and at least one second magnet (e.g., the second magnet 261b in FIG. 3) disposed on the first ornamental ring and configured to generate an attractive force with the first magnet. The second magnet may be aligned to selectively face the first magnet when the first ornamental ring rotates relative to the base ring.

According to various embodiments, the electronic device may further include a pressing member (e.g., the pressing member 301 in FIG. 12) provided to be capable of being coupled to the first surface in a state of facing the first surface, and a rotating member (e.g., the rotating member 302 in FIG. 12) rotatably mounted on the pressing member. In the state of being coupled to the first surface, the pressing member may press the second ornamental ring so as to fix the second ornamental ring at the second position, and the rotating member may be fastened to the first ornamental ring.

According to various embodiments, multiple second magnets may be arranged at an interval of a first angle in a rotating direction of the base ring, and the rotating member may be configured to be rotatable in a second angular range, which is half of the first angle, relative to the pressing member.

According to various embodiments, the electronic device may further include a stopper member (e.g., the stopper member 241 in FIG. 10) extending from the second ornamental ring and at least partially disposed between the base ring and the first ornamental ring, and a stopper recess (e.g., the stopper recess 221 in FIG. 10) formed on the base ring. At the second position, the stopper member may be selectively engaged with the stopper recess.

According to various embodiments, the stopper member may include an extension (e.g., the extension 241a in FIG. 10) extending from the outer circumferential surface of the second ornamental ring and a protrusion (e.g., the protrusion 241b in FIG. 10) protruding from the extension and selectively engaged with the stopper recess.

According to various embodiments, the electronic device may further include: an avoidance recess (e.g., the avoidance recess 243 in FIG. 7) formed on an outer circumferential surface of the second ornamental ring; and a protrusion (e.g., the guide protrusion 235 in FIG. 7) formed on the guide member. The guide protrusion may be accommodated in the avoidance recess so as to limit a range of a linear reciprocating motion of the second ornamental ring.

According to various embodiments, the electronic device may further include at least one elastic member (e.g., the second elastic member 245 in FIG. 9) mounted on the housing. The elastic member may be configured to provide an elastic force to the second ornamental ring in a direction in which the second ornamental ring moves to the first position.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a housing comprising a first surface oriented in a first direction, a second surface oriented in a second direction opposite to the first direction, and a side surface at least partially surrounding a space between the first surface and the second surface;
   a base ring located adjacent to an edge area of the first surface and rotatably mounted on the housing;
   at least one first magnet disposed on the base ring;
   a first ornamental ring detachably mounted on the base ring and configured to rotate relative to the housing together with the base ring;
   at least one second magnet disposed on the first ornamental ring and configured to generate an attractive force with the first magnet; and
   an interference member configured to perform a linearly reciprocating motion between a first position and a second position closer to the second surface than the first position, the interference member being located adjacent to the base ring and the first ornamental ring,
   wherein, at a position where the first magnet and the second magnet face each other, the first ornamental ring is mounted on the base ring, and
   wherein at the second position, the interference member is configured to maintain or fix the base ring in a stationary state relative to the housing by being at least in partial contact with the base ring and the first ornamental ring rotates relative to the base ring such that the second magnet leaves the position where the second magnet faces the first magnet.

2. The electronic device of claim 1, wherein the interference member comprises a second ornamental ring disposed to surround at least a partial area of the first surface.

3. The electronic device of claim 2, wherein the first ornamental ring is disposed to surround the second ornamental ring or to be in contact with the second ornamental ring.

4. The electronic device of claim 2, further comprising:
   a guide member fixed to the housing and configured to restrain the base ring to the housing in a rotatable state.

5. The electronic device of claim 4, wherein the guide member comprises a fixed ring fixed in a state of being in contact with the housing and a rubbing ring provided on the fixed ring and configured to come into contact with the base ring.

6. The electronic device of claim 4, further comprising:
   an avoidance recess formed on an outer circumferential surface of the second ornamental ring; and
   a guide protrusion formed on the guide member,
   wherein the guide protrusion is accommodated in the avoidance recess so as to limit a range of a linear reciprocating motion of the second ornamental ring.

7. The electronic device of claim 2, further comprising:
   a magnet disposed on at least one of the base ring and the first ornamental ring,
   wherein the first ornamental ring is mounted on the base ring by an attractive force of the magnet.

8. The electronic device of claim 2, wherein at the second position, the base ring is maintained in the stationary state on the housing, and the first ornamental ring is configured to be rotatable relative to the base ring.

9. The electronic device of claim 2, further comprising:
   at least one elastic member mounted in the housing,
   wherein the elastic member is configured to provide an elastic force to the second ornamental ring in a direction in which the second ornamental ring moves to the first position.

10. The electronic device of claim 2, further comprising:
    a stopper member extending from the second ornamental ring; and
    a stopper recess formed on the base ring,
    wherein at the second position, the stopper member is selectively engaged with the stopper recess.

11. The electronic device of claim 1,
    wherein the interference member comprises a dummy pin configured to perform a linearly reciprocating motion in the housing, and
    wherein the dummy pin is configured to be fixed to the first position by receiving an elastic force and to move to the second position by receiving an external force so as to maintain or fix the base ring in the stationary state.

12. An electronic device comprising:
    a housing comprising a first surface in which a display is disposed, a second surface facing away from the first surface, and a side surface at least partially surrounding a space between the first surface and the second surface;
    a base ring having a shape surrounding at least a portion of the first surface and rotatably mounted on the housing;
    at least one first magnet disposed on the base ring;
    a first ornamental ring disposed to surround at least a portion of the first surface, mounted on the base ring by a magnetic force, and configured to rotate relative to the housing together with the base ring;
    a guide member fixed to the housing and configured to restrain the base ring to the housing in a rotatable state;
    at least one second magnet disposed on the first ornamental ring and configured to generate an attractive force with the first magnet; and
    a second ornamental ring disposed to surround at least a portion of the first surface and mounted on the housing and configure to perform a linearly reciprocating motion between a first position and a second position,
    wherein, at a position where the first magnet and the second magnet face each other, the first ornamental ring is mounted on the base ring, and
    wherein at the second position, the second ornamental ring is configured to maintain or fix the base ring in a stationary state on the housing by being at least in partial contact with the base ring, the magnetic force between the base ring and the first ornamental ring varies when the first ornamental ring rotates relative to the base ring and the first ornamental ring rotates relative to the base ring such that the second magnet leaves the position where the second magnet faces the first magnet.

13. The electronic device of claim 12, further comprising:
a pressing member configured to couple to the first surface in a state of facing the first surface; and
a rotating member rotatably mounted on the pressing member,
wherein in a state of being coupled to the first surface, the pressing member presses the second ornamental ring so as to fix the second ornamental ring at the second position, and the rotating member is fastened to the first ornamental ring.

14. The electronic device of claim 13, wherein multiple second magnets are arranged at an interval of a first angle in a rotating direction of the base ring, and the rotating member is configured to be rotatable in a second angular range, which is half of the first angle, relative to the pressing member.

15. The electronic device of claim 12, further comprising:
a stopper member extending from the second ornamental ring and at least partially disposed between the base ring and the first ornamental ring; and
a stopper recess formed on the base ring,
wherein at the second position, the stopper member is selectively engaged with the stopper recess.

16. The electronic device of claim 15, wherein the stopper member comprises an extension extending from an outer circumferential surface of the second ornamental ring and a protrusion protruding from the extension and selectively engaged with the stopper recess.

17. The electronic device of claim 12, further comprising:
an avoidance recess formed on an outer circumferential surface of the second ornamental ring; and
a guide protrusion formed on the guide member,
wherein the guide protrusion is accommodated in the avoidance recess so as to limit a range of a linear reciprocating motion of the second ornamental ring.

18. The electronic device of claim 12, further comprising:
at least one elastic member mounted in the housing,
wherein the elastic member is configured to provide an elastic force to the second ornamental ring in a direction in which the second ornamental ring moves to the first position.

\* \* \* \* \*